United States Patent
Golec et al.

(10) Patent No.: US 10,002,372 B2
(45) Date of Patent: Jun. 19, 2018

(54) DUPLICATE CHECK BASED ON GENERATED HASH VALUE

(71) Applicant: SAP SE, Walldorf (DE)

(72) Inventors: Adrian Golec, Schwetzingen (DE);
Georg Lang, Ludwigshafen (DE);
Fabian Hammann, Schifferstadt (DE);
Artur Kaufman, Landau (DE); Dennis Kurfiss, Zaisenhausen (DE)

(73) Assignee: SAP SE, Walldorf (DE)

( * ) Notice: Subject to any disclaimer, the term of this patent is extended or adjusted under 35 U.S.C. 154(b) by 420 days.

(21) Appl. No.: 14/854,639

(22) Filed: Sep. 15, 2015

(65) Prior Publication Data
US 2017/0076342 A1    Mar. 16, 2017

(51) Int. Cl.
*G06F 17/30* (2006.01)
*G06Q 30/04* (2012.01)

(52) U.S. Cl.
CPC ......... *G06Q 30/04* (2013.01); *G06F 17/3033* (2013.01); *G06F 17/30303* (2013.01)

(58) Field of Classification Search
CPC .................... G06F 17/30292; G06F 17/30303
See application file for complete search history.

(56) References Cited

U.S. PATENT DOCUMENTS

| | | | | |
|---|---|---|---|---|
| 7,584,228 | B1* | 9/2009 | Protassov | G06F 17/30156 |
| 2003/0200459 | A1* | 10/2003 | Seeman | G06F 21/10 726/26 |
| 2004/0243539 | A1* | 12/2004 | Skurtovich, Jr. | G06Q 40/02 |
| 2007/0156583 | A1* | 7/2007 | Ripp | G06Q 20/102 705/40 |
| 2007/0162430 | A1* | 7/2007 | Bader | G06F 17/30477 |
| 2013/0166581 | A1* | 6/2013 | Teicher | G06F 3/01 707/758 |

* cited by examiner

*Primary Examiner* — William Spieler
(74) *Attorney, Agent, or Firm* — Schwegman Lundberg & Woessner, P.A.

(57) ABSTRACT

In an example embodiment, a method of handling duplicate records in a computer database is provided. A record is received via an API. An item type associated with the record is identified. A duplicate check schema corresponding to the item type is obtained. A string is generated for the record by extracting values for each of a plurality of fields, defined in the duplicate check schema, located in the record and concatenating the values. Then a hash algorithm is applied to the string to create a hash for the record. The hash for the record is compared to hashes from previous records stored in the computer database to identify whether the hash is a duplicate. In response to a determination that the hash is a duplicate, one or more processing rules from the duplicate check schema are executed.

20 Claims, 22 Drawing Sheets

| DFKKBIXBIT_DC | |
|---|---|
| KEY FIELDS | MANDT |
| | DCSCHEME (CAN BE USED FOR TABLE PARTITIONING) |
| | GPART |
| | BITHASH (HASH-VALUE/"FINGERPRINT") |
| | CONSNO |
| DATA FIELDS | BITCAT |
| | VKONT |
| | VTREF |
| | SUBAP |
| | SRCTATYPE |
| | SRCTAID |
| | BITPACKUUID |
| | BITDATE |
| | BITTIME |
| | CRDATE -> OF THE RECORD IN DFKKBIXBIT_DC |
| | CRTIME -> OF THE RECORD IN DFKKBIXBIT_DC |
| | CRMODE -> DES BITS OF THE BILLABLE ITEM |
| | BITREVERSED |
| | EXCREASON |
| | .CI_INCLUDE |
| SECONDARY INDEXES: | 1) DCSCHEME, SRCTATYPE, SRCTAID |
| | 2) DCSCHEME, CRDATE |
| | 3) DCSCHEME, EXPIRY_DATE |

*FIG. 13*

DUPLICATE CHECK BASED ON GENERATED HASH VALUE

TECHNICAL FIELD

This document generally relates to systems and methods for use with managing computer records for improved computer efficiency. More specifically, this document relates to methods and systems for performing a duplicate check on records using a generated hash value

BACKGROUND

In high volume transaction computer systems, when a database is being filled with records, it is often difficult to check for duplicates. This can be due to the fact that when the tables are generated, it is common for table names to be unknown up front, as well as at least some of the fields to be unknown up front. Additionally, the structure of some tables may be dynamic, making it even more difficult to identify duplicates during database loading. Furthermore, a number of records in the tables require rapid deletion, which make it difficult to implement a duplicate check with build-in database methods such as uniqueness constraints for database indexes. As soon as the data is deleted (due to legal compliance or in order to save disk space), the duplicate check can not operate on only the database level.

One area in which this problem is extremely prevalent is in enterprise resource planning (ERP) systems. ERP systems allow for the integration of internal and external management information across an entire organization, including financial/accounting, manufacturing, sales and service, customer relationship management, and the like. The purpose of ERP is to facilitate the flow of information between business functions inside the organization and manage connections to outside entities. Convergent Invoicing (CI) integrates ERP and Customer Relationship Management (CRM) systems so that organizations with complex billing processes can create, change, and cancel billable accounts for customers, as well as retrieve and view invoicing data for services rendered on demand. These systems often have very high transaction counts (e.g., 100 million transactions per day), making it difficult to prevent duplicate transactions from occurring, and yet the repercussions from duplicates can be formidable, with invoices with duplicate entries being sent to customers resulting in overcharging and/or a perception of a lack of quality control.

BRIEF DESCRIPTION OF DRAWINGS

The present disclosure is illustrated by way of example and not limitation in the figures of the accompanying drawings, in which like references indicate similar elements and in which:

FIG. 13 is a diagram illustrating a schema table in accordance with an example embodiment.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

In an example embodiment, before records are utilized (e.g., before a bill is generated based on the records), a string is created by concatenating field values defined in a duplicate check scheme. When the records are utilized (e.g., when a record state is changed to billable), a hash value is created for the string for each record and a duplicate check is performed by locating records having identical hash values. Such duplicate records can then be identified and handled according to a desired plan.

Figure 1:
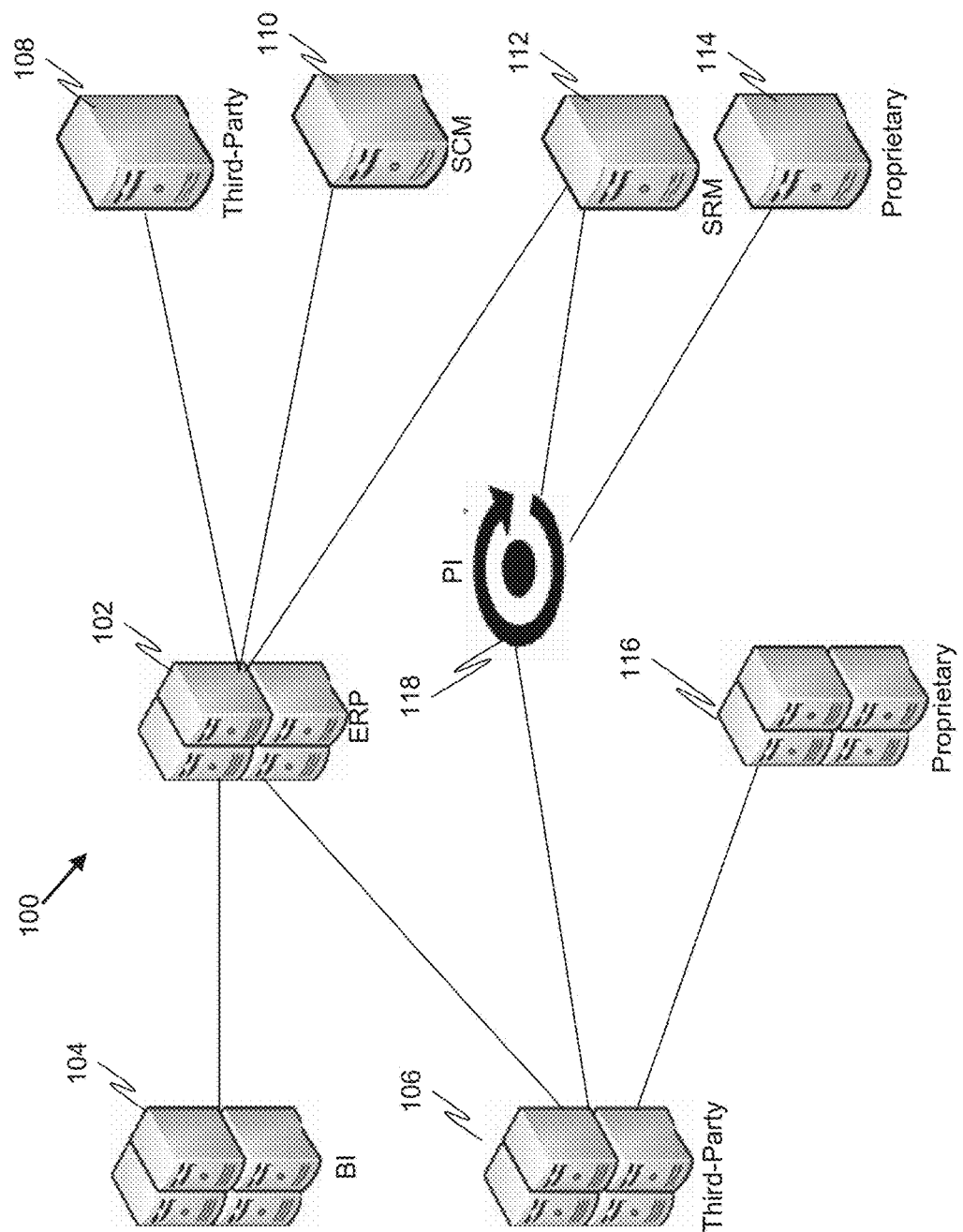
FIG. 1 depicts an application landscape, in accordance with an example embodiment.

FIG. 1 depicts an application landscape, in accordance with an example embodiment. The application landscape 100 comprises different heterogeneous software and/or hardware components 102 to 118, which are connected to each other as shown by the solid lines in FIG. 1, and which may operate together in the application landscape 100 to process, for example, a business scenario. The application landscape 100 may comprise an ERP 102. The ERP 102 may integrate internal and external management information across an entire organization, embracing different activities and/or services of an enterprise. ERP 102 automates the activities and/or services with an integrated computer-based application. An ERP 102 can run on a variety of hardware and/or network configurations, typically employing a database to store its data. The ERP 102 may be associated with (e.g., directly or indirectly connected to and/or in (networked) communication with) a business intelligence (BI) component 104, one or more third parties 106 and 108, a supply chain management (SCM) component 110, and/or a supplier relationship management (SRM) component 112. The SRM component 112 and/or the SCM component 110 may further be associated with at least one proprietary service 114. Furthermore, at least one of the third parties 106 may also be associated with at least one proprietary service 116. The BI component 104 may provide historical, current, and predictive views of business processes and/or business scenarios, for example, performed on the ERP 102. Common functionality of business intelligence technologies may comprise reporting, online analytical processing, analytics, data mining, business performance management, benchmarking, text mining, and/or predictive analytics. The functionality may be used to support better decision making in the ERP 102. The SCM component 110 may manage a network of interconnected businesses involved in the provision of product and/or service packages used by end consumers such as the ERP 102. The SCM component 110 may span movement and storage of raw materials, work-in-process inventory, and finished goods from point of origin to point of consumption (also referred to as a supply chain). The SRM component 112 may specify collaborations with suppliers that are vital to the success of the ERP 102 (e.g., to maximize the potential value of those relationships). All of these systems may be integrated via a process integration (PI) component 118.

Figure 2:
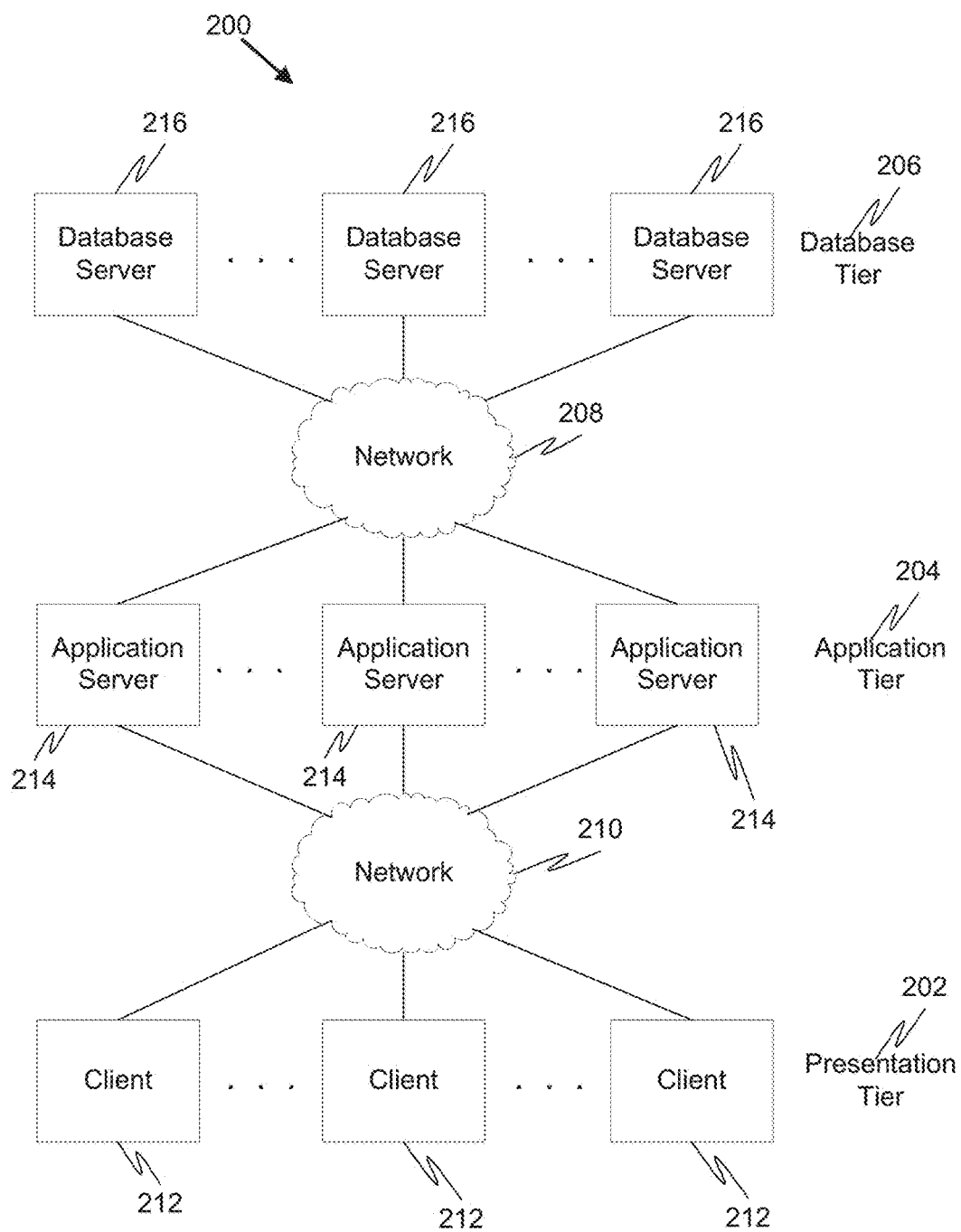
FIG. 2 is a block diagram of a three tier architecture system, in accordance with an example embodiment.

FIG. 2 is a block diagram of a three tier architecture system, in accordance with an example embodiment. The system 200 includes a presentation tier 202, an application tier 204, and a database tier 206. Networks 208, 210 connect the devices within and between the tiers 202, 204, 206. The networks 208, 210 may include one or more networks, such as a local area network (LAN), a wide area network (WAN), or the Internet.

The presentation tier 202 generally includes one or more client computers 212. The client computers 212 generally provide a graphical user interface for users to interact with the other parts of the system 200. The user interface may be implemented by a browser, for example as a Java application.

The application tier 204 generally includes one or more application servers 214. The application servers 214 generally implement the business logic for processing interactions between the users and the underlying data. This business logic is generally referred to as "the application" or "the application program." The application tier 204 may implement various applications to perform various functions, such as invoicing, inventory control, supply chain management, and the like. Various of the application servers 214 may perform different functions. For example, one of the application servers 214 may be used for prototyping or development, while the others may be used for business intelligence production activities.

The database tier 206 generally includes one or more database servers 216. The database servers 216 generally implement a database management system that stores and manipulates the underlying data and related metadata. This database management system is generally referred to as "the database," "the database system," or "the database program." The database servers 216 may implement various types of database systems, including HANA™, DB2™, Informix™, MaxDB™, Oracle™ and Microsoft™ SQL Server.

Although many separate devices are shown in each tier, this is mainly for illustration purposes to show scalability. For example, a single database server 216 may be used in a basic configuration, but as the amount of data in the databases increases, the number of database servers 216 may be increased. As another example, a single application server 214 may be used in the basic configuration, but as the amount of business logic processes increases, the number of application servers 214 may be increased.

The various devices in the various tiers may implement different operating systems. For example, a client computer 212 may run Microsoft Windows and an application server 214 may implement Linux. Note that various devices generally implement both an operating system program and another program, which are distinct. For example, a client computer 212 may implement Microsoft Windows (operating system) and Microsoft Internet Explorer (user interface program). An application server 214 may implement Linux (operating system) and an invoicing system (application program). A database server 216 may implement Linux (operating system) and Oracle database (database program).

An example embodiment generally involves an application program and a database program, as detailed below.

Figure 3:
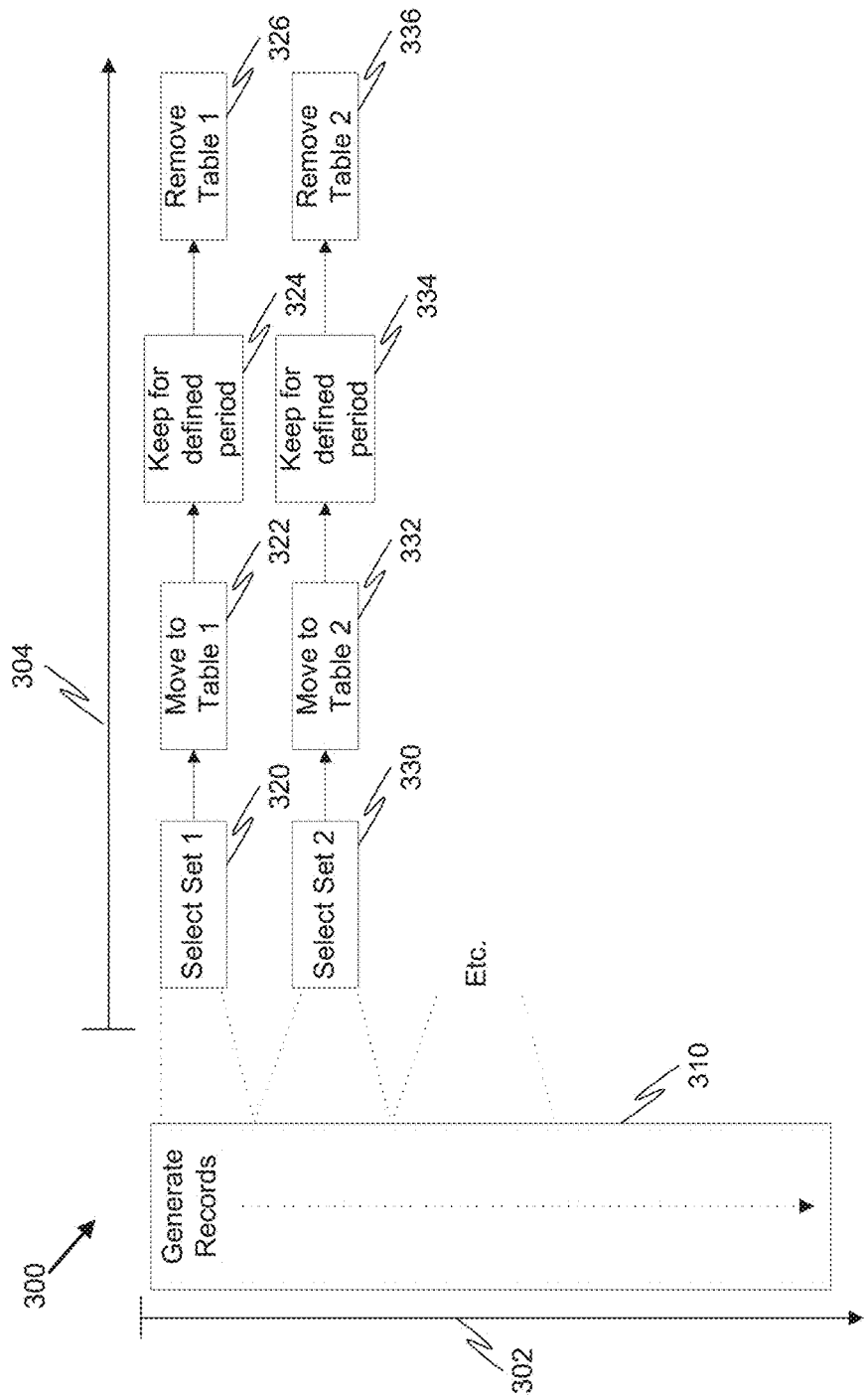
FIG. 3 is a diagram of a timeline that is used to illustrate an example embodiment of a convergent invoicing system.

FIG. 3 is a diagram of a timeline that is used to illustrate an example embodiment of a convergent invoicing system. The timeline 300 includes a y axis 302 and an x axis 304. The y axis 302 shows the flow of a generally continuous data generation process where records 310 are generated. (The term "record" generally refers to a line item in a database that includes one or more pieces of data; a record may also be referred to as a "transaction.") These records 310 may be (for example) telephone call records, including information such as the calling number, the called number, the start time, the duration, the account number, the applicable tariff, the applicable tax, and the like. These records 310 are being continuously generated by the application program (see the application server 214 in FIG. 2 and related description). In the context of a convergent invoicing system, "generated" also includes receiving records from other systems. For example, Company X may generate a record and send the record to Company Y, in which case Company Y generates a corresponding record in the records 310. The number of records in the records 310 may be very large (for example, 1,000,000 customers each receive an invoice with 100 to 1000 calls every month, times the number of months retained in the records 310). The records 310 may be stored in a table in a database (see the database server 216 in FIG. 2 and related description).

The x axis 304 shows the flow of data processing according to an example embodiment of a convergent invoicing system. At operation 320, for a given time period, a set of records is selected from the records 310. The time period may be, for example, a month; and the records selected are those that are to be invoiced for that month. The application program (see the application server 214 in FIG. 2 and related description) may select the set.

In an example embodiment, the set is selected as part of another process that may already be occurring as part of the data processing operations of the system 200 (see FIG. 2). For example, an invoicing process may already be occurring as one of the data processing operations. In such a case, the set selected for invoicing is also the set used in the additional processing described below.

At operation 322, the set selected in operation 320 is moved to a table in the database. In general, this table includes only the set selected in 320, and no others (e.g., the table excludes the records 310 that are not in the set). The application program (see the application server 214 in FIG. 2 and related description) may instruct the database program (see the database server 216 in FIG. 2 and related description) to move the set to the table in the database. The table may include other information related to the records in the set; for example, the set may be indexed according to the account number associated with each record.

At operation 324, the table (see 322) is stored for a defined duration. This duration may be set according to various factors. For example, there may be a legal requirement to store the records for a certain amount of time. There may be a contractual arrangement with the customers to store the records for a certain amount of time. The operator of the system 200 (see FIG. 2) may desire to delete records from the database, or to move records from the database to archival storage, after a certain amount of time. The operator of the system 200 (see FIG. 2) may desire to move or delete the records from the database after the associated invoices have been paid. The defined duration may then be selected to account for these time periods, or to account for other criteria.

At operation 326, the table (see operation 322) is removed from the database after the defined duration (see operation 324) has passed. The application program (see the application server 214 in FIG. 2 and related description) may instruct the database program (see the database server 216 in FIG. 2 and related description) to remove the table from the database. The table may be deleted, moved to archival storage, and so forth. If the database program itself includes functionality to move the table to archival storage, then the application program may instruct the database program to do so. Otherwise, the application program may coordinate with other components of the application landscape 100 (see FIG. 1) to move the table from the database to the archival storage. According to an embodiment, the SQL statement DROP TABLE may be used to remove the table or the SQL statement TRUNCATE TABLE may be used to delete the records.

As the records 310 continue to be generated, other sets may be selected, moved, and removed in a similar manner to that described above (see operation 320, operation 322, operation 324 and operation 326), as further detailed below.

At operation 330, for another given time period, a second set of records is selected from the records 310. In general, this time period immediately follows the preceding time period (see operation 320) without overlap. For example, if invoices are prepared monthly, then the first time period (see operation 320) may correspond to January, and the second time period (see operation 330) may correspond to February. In such a case, there is no duplication of a record in the first set and the second set. According to another example embodiment, the time periods (see operation 320 and operation 330) may overlap, in which case there may be duplication of records in the first set and the second set. According to another example embodiment, there may be a gap between the first time period and the second time period, in which case some of the records 310 may not be selected for moving to a table.

At operation 332, the second set (selected in operation 330) is moved to a second table in the database. As with the first table (see operation 322), the second table, in general, excludes any of the records 310 that are not in the second set.

At operation 334, the second table (see operation 332) is stored for a defined duration. In general, this defined duration (in operation 334) has the same length as the first defined duration (in operation 324). However, the length could also differ. For example, the contractual arrangement with customers may be changed such that the duration is shortened (or lengthened).

At operation 336, the second table (see operation 332) is removed from the database after the defined duration (see operation 334) has passed.

In a similar manner, additional sets of data beyond the two shown and described may be selected, moved to tables, and the tables removed, as the records 310 continue to be generated. According to an example embodiment, the records in the tables may be further arranged according to the account status (e.g., unbilled records, billed records, settled invoices, etc.). In general, these tables may be referred to as "parallel tables" in which the transactional data is divided amongst the tables in a "parallel" manner. Such an arrangement may be contrasted with existing transactional data processing systems that store the transactional data in a single table (e.g., the data is added to the single table for example in a "sequential" or "serial" manner).

The following discussion provides more details of a specific implementation of an invoicing system that implements one or more of the data processing features that were described above. The invoicing system may be referred to as a convergent invoicing system, in that it generates a convergent bill where billing data from various sources is aggregated into a single invoice and is processed together. In general, the convergent invoicing system provides the interface to the account receivables system; handles account receivables charges, discounts and taxes; and supports bill data extraction and formatting for print. The convergent invoicing system may be part of another component, such as a contract accounts and receivable and payable (FI-CA) component, that may be part of a larger software system such as an enterprise resource planning financials program (which will be described later in reference to FIG. 4). The convergent invoicing system may include a billing subcomponent, a rating subcomponent, and an invoicing subcomponent.

The billing subcomponent processes transactions and additional data from other systems and creates structured bill content. Billing provides a billable item management feature that allows a user to transfer, store and monitor billable items and prepare them for billing execution. The billing subcomponent covers the handling of billable items for the purpose of creating, simulating and reversing billing documents.

The invoicing subcomponent allows a user to create convergent invoices. It merges billing information from a local billing system, and billing systems from other providers, into customer invoices. The invoicing process integrates the billing documents in the invoicing subcomponent. The invoicing subcomponent creates the invoice document that saves the information for the invoice and that is the base for the physical invoice printings and posts the invoice synchronously (although in some embodiments this can also be performed asynchronously). Additionally the invoicing subcomponent may perform the following tasks: (1) Billing documents from different billing systems are selected, grouped, and displayed together on one invoice; (2) Billing documents are transferred to postings documents in the FI-CA component synchronously (the invoice display of the tax amounts can influence the tax to be posted (note this process could also be performed asynchronously)); (3) simultaneously, correspondence containers are created for invoice printing, and additional data is updated for providing data to a business intelligence system; and (4) current information for the customer account, such as open invoice receivables, can be displayed on the invoice. Further FI-CA business transactions can be integrated in the invoicing processes such that the customer can be informed of changes to the customer account with the invoice. For example, in an invoicing run, a contract account maintenance can be processed by the run. The invoicing run can clear open items of an invoice with credit memo items of a contract account.

The rating subcomponent takes consumptions items and creates billable items based on a ratings process.

In general, invoicing orders must exist in order for an invoicing process to be started. These are created when a billing document is created and are used for specific selection of the billing documents not yet processed by an invoicing process. If the invoicing of a billing document is successful, the related invoicing order is deleted.

In addition to billing documents that arise in the local system from the transfer of billing documents from external systems, sales and distribution (SD) billing documents from the SD component and collective bills from the FI-CA component can also be understood as invoiceable billing documents. Special invoicing processes can process these source documents, provided there are invoicing orders of the corresponding source document category.

Parallel processing of the dataset is generally possible. The invoicing processes use the function of the mass activity in FI-CA to split the dataset and distribute processing to different processes in order to reduce the processing time. Parallel processing may also be performed during part or all of the process described in FIG. 3.

The Contract Accounts Receivable and Payable component is a subledger developed for industries with a large number of business partners and a correspondingly high volume of documents to post, such as telecommunications companies. This component provides standard accounts receivable and accounts payable functions including dunning, posting documents, and making payments.

The business processes and functions of the FI-CA component may be integrated with a customer relationship management client, such as the CRM Interaction Center Web Client, by means of a financial customer care component. Example CRM functions include the following: (1) financial customer care (this scenario offers basic functions, such as an account overview, the display of the dunning history, and the search for payments of a customer); and (2) collections management (this scenario covers important processes, such as the initiation of customer calls, processing of payments, and the granting of deferrals and installment plans).

A billable item is created by a business transaction or business event and is an item that is to be billed. A billable tem is an item that is to be billed. A billable item can have different statuses at different points in time. In billing, the system considers only those billable items that have the status "billable." Once these items are successfully processed during billing, the system sets their status to "billed." The various statuses of billable items may be reflected on a technical level using different database tables. According to an embodiment, there is one database table for each combination of status and billable item class (described below). One exception to this rule is the status "billed." For this status, the user can specify how many tables are used, and how they are to be used. As an example, the system 200 allows the system operator to configure up to 100 parallel tables for transactional use.

The upload rule specifies that the system does one of the following with billable items during the transfer: (1) adds them directly to the table of billable items; (2) adds them to the table for raw data; and (3) returns them as having errors.

In relation to the database tables used, the system may differentiate based on the following record types: (1) main items, which represent the actual receivable or payable; and (2) record types dependent on main items, which represent attachments to the main items (for example, credit card payments or taxation information). The main items and the dependent record types may use separate database tables.

The billable item class determines the following technical attributes of a billable item: (1) database tables in which the system saves the billable items, dependent on their status and on the record type they belong to; (2) function modules that receive the billable items; (3) function modules that save the billable items to the appropriate database tables; and (4) specific fields of billable items that are added either by customer selection of interface components or using customer fields. For each billable item class, customer-specific checks and data enrichment can be added at various events.

The interface component represents a business process from the viewpoint of billing. The interface component defines which business transactions a billable item class supports (such as deferred revenues and down payment clearings). Interface components are therefore the interface of a billable item class. From a technical perspective, an interface component consists of the documentation of the component, the selection of needed fields, and the specification of dependent/prerequisite interface components, along with checks, derivations, and assignments of field values.

A source transaction is defined by the combination of a source transaction type and source transaction identification. A source transaction represents a group of billable items that belong together from a business viewpoint. According to an embodiment, further processing of billable items may be controlled by the source transaction (that is, by each combination of a source transaction ID and source transaction type). A source transaction can include billable items belonging to different record types.

The billable item type, together with the subprocess, specifies the business significance of an individual billable item. Each item type is assigned to one or more subprocesses.

A subprocess is a self-sufficient processing branch within a billing process for the selection and grouping of billable items and forming a billing document. According to an example embodiment, billable items are immediately assigned to a subprocess when they are created. In such an example embodiment, it is not desirable for the system to process them together with billable items of another subprocess in a common billing document.

The billing process is the superordinate term for the execution of billing according to defined rules. These rules are defined by parameters used to control the billing process. The billing process specifies which subprocesses it supports. For each subprocess, the billing process specifies: (1) which contract accounts are billed; (2) which billable items are selected for billing; and (3) how the billable items are grouped into billing units and, as a consequence, how they are grouped into billing documents.

The selection variant specifies which billable item class the billable items are selected from, and therefore also which billable items are processed in the billing process.

The grouping variant is used for storing the rules for automatic grouping of billable items for processing during billing. The grouping variant determines which billable items are grouped together in one billing unit and controls the link between the billable items and the items of the billing document.

An invoicing process is the superordinate term for the execution of invoicing functions according to defined rules. The invoice process controls: (1) selection of the source documents to be invoiced; (2) summary of source documents to invoicing units; and (3) selection of invoicing functions.

As discussed above, the system 200 may select and move the records to the tables (see 320 and 322 above) as part of other data processing operations. One such data processing operation is the billing process. In general, billing takes place in four individual process steps: data selection, creation of billing units, aggregation of billable items, and updating.

During data selection, the system 200 selects the billable items for the billing process. For example, this selection may also be used as the selection described above at 320. The user may define the selection criteria for the data selection in selection variants for the billing process.

During the creation of billing units, the system 200 groups together the selected billable items into billing units for each contract account. Multiple billing units can be created for each contract account. Billing in Contract Accounts Receivable and Payable creates one billing document for each billing unit. The user may define the criteria that are used to create the billing units in grouping variants for the billing process.

During the aggregation of billable items, the system 200 includes the selected billable items of a billing unit in the billing document. More exactly, the billable items are summarized in billing document items. The individual items that belong to this summarization are linked with the billing document item.

During updating, the system 200 writes the billing document created for the billing unit and the individual billed items to the database, and at the same time deletes the processed billable items.

Figure 4:
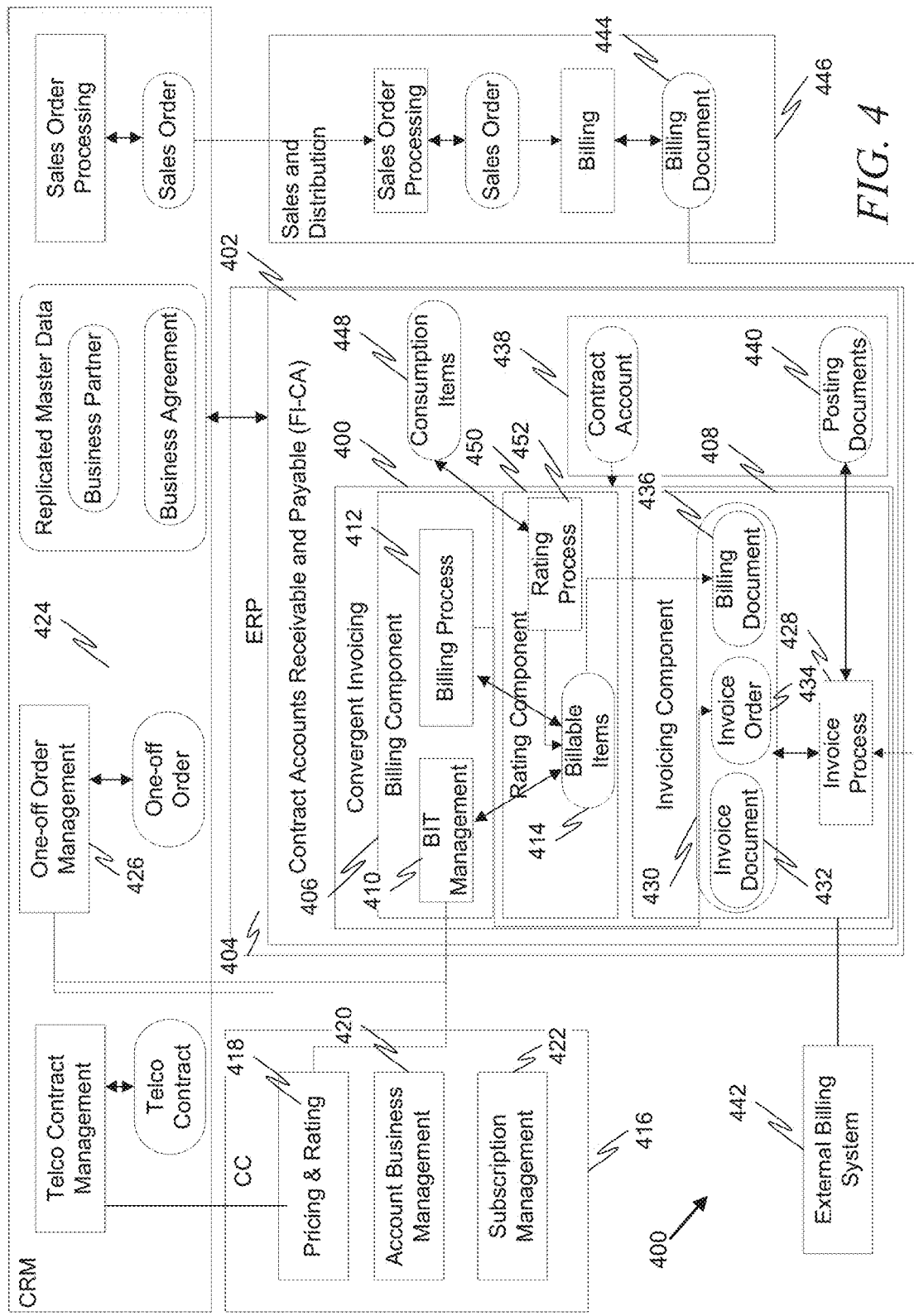
FIG. 4 is an architecture diagram illustrating a convergent invoicing system within an ERP, in accordance with an example embodiment.

FIG. 4 is an architecture diagram illustrating a convergent invoicing system within an ERP, in accordance with an example embodiment. Convergent invoicing system 400 may be run within a FI-CA system 402 within an ERP 404. The convergent invoicing system 400 may include a billing component 406 and an invoicing component 408. The billing component 406 may include a billable item (BIT) management component 410, a billing process 412, and billable items 414. The billable items 414, as described earlier, may be stored in a database. The BIT management component 410 may interface with a convergent charging (CC) component 416. The CC component 416 has the ability to control services and manage balances in real-time. This includes, for example, authenticating a customer and checking the account balance before service delivery to the customer (an example service delivery may be an Internet download). It can also notify users when the account balance threshold set by the operator is reached, or terminate service connectivity when real-time charging indicates that credit has been depleted. This is accomplished using a pricing and rating module 418, an account business management component 420, and a subscription management component 422.

The BIT management component 410 may also interface with a CRM system 424 and, specifically, the one-off order management component 426 of the CRM system 424.

The invoicing component 408 may include an invoice process 428, as well as invoice data 430, which includes at least one invoice document 432, at least one invoice order 434, and at least one billing document 436. The invoice process 428 may coordinate with a database 438 to post documents 440 and generate the invoice data 430, as well as coordinate with an external billing system 442 to actually send out bills.

The invoice process 428 also interfaces with billing documents 444 generated by a sales and distribution component 446.

Consumption items 448 may also be used by the rating component 450. Business transactions or business events can initiate the creation of consumption items. The consumption items contain detailed information on consumption, such as the amount, time, type, and the consumer required for rating and billing these items. They form the basis for billable items in the rating. A rating process 452 may create billable items 414 from the consumption items 448.

In an example embodiment, a duplicate check is performed on billable items (BITs) 414 and consumption items (CITs) 448. In both billable items 414 and consumption items 448 it is common for administrators to create custom table fields that are not known up front. In the case of billable items 414, roughly 20% of all records contain such custom fields, while in the case of consumption items 448, roughly 80% of all records contain such fields. Based on this situation, a static duplicate check is not possible in such computer systems as the system is unable to know either the tables to select from nor the fields that should be used to identify duplicate records.

In an example embodiment, the duplicate check that is performed aids in avoiding multiple invoices for the same charge and reducing the need for manual correction of related invoices.

In an example embodiment, before BITs are assigned a status of billable or CITs are assigned a status of unrated (indicating they are ready for rating, a string is created for the BIT or CIT by concatenating the field values defined in duplicate check characteristics of a duplicate check scheme. The BITs and CITs can be saved in excepted BIT and excepted CIT form, respectively, using a customized exception reason that stores the string. When the data is transferred to the status of billable or unrated, a hash value is created for the string. In an example embodiment, the secure hash algorithm (SHA)-1 is used, but other hash algorithms can be used in lieu of SHA-1. The following is example pseudocode of a SHA-1 hash algorithm:

Note 1: All variables are unsigned 32 bits and wrap modulo $2^{32}$ when calculating, except
   ml the message length which is 64 bits, and
   hh the message digest which is 160 bits.
Note 2: All constants in this pseudocode are in big endian. Within each word, the most significant byte is stored in the leftmost byte position
Initialize Variables:
h0=0x67452301
h1=0xEFCDAB89
h2=0x98BADCFE
h3=0x10325476
h4=0xC3D2E1F0
ml=message length in bits (always a multiple of the number of bits in a character).
Pre-processing:
append the bit '1' to the message, i.e., by adding 0x80 if characters are 8 bits.
append 0≤k<512 bits '0', thus the resulting message length (in bits) is congruent to 448 (mod 512)
append ml, in a 64-bit big-endian integer. So now the message length is a multiple of 512 bits.
Process the Message in Successive 512-bit Chunks:
break message into 512-bit chunks
for each chunk
   break chunk into sixteen 32-bit big-endian words w[i], 0≤i≤15
   Extend the sixteen 32-bit words into eighty 32-bit words:
   for i from 16 to 79
      w[i]=(w[i−3] xor w[i−8] xor w[i−14] xor w[i−16]) leftrotate 1
   Initialize Hash Value for this Chunk:
   a=h0
   b=h1
   c=h2
   d=h3
   e=h4
   Main Loop
   for i from 0 to 79
      if 0≤i≤19 then
         f=(b and c) or ((not b) and d)
         k=0x5A827999
      else if 20≤i≤39
         f=b xor c xor d
         k=0x6ED9EBA1
      else if 40≤i≤59
         f=(b and c) or (b and d) or (c and d)
         k=0x8F1BBCDC
      else if 60≤i≤79
         f=b xor c xor d
         k=0xCA62C1D6
      temp=(a leftrotate 5)+f+e+k+w[i]
      e=d
      d=c
      c=b leftrotate 30
      b=a
      a=temp
   Add this Chunk's Hash to Result so far:
   h0=h0+a
   h1=h1+b
   h2=h2+c
   h3=h3+d
   h4=h4+e
Produce the Final Hash Value (Big-endian) as a 160 Bit Number:
hh=(h0 leftshift 128) or (h1 leftshift 96) or (h2 leftshift 64) or (h3 leftshift 32) or h4

The resulting hash value is stored as a fingerprint in a special database table, which may be referred to in this document as DC-Table, standing for duplicate check table.

The DC-Table can be accessed using a bulk select for all entries to retrieve any duplicate hash values (fingerprints which have been previously loaded in the system and thus are already recognized). If there are no duplicates, the select function will not return any variables. If, however, the select function returns entries, the system may then collect information and sort duplicates according to a processing rule from a duplicate check scheme, propagate erroneous records to the function module assigned to the duplicate check scheme so that the customer can overrule the processing rule and also accept duplicate records, and, if the customer accepts the duplicate, a new entry can be inserted with a new hash value by, for example, increasing it by 1.

In an example embodiment, a user interface is provided to allow an administrator to select the fields used to generate the hash values for each record as well as select various options for treatment of an item once identified as a duplicate. This user interface makes the solution fully configurable by users to adjust for many different data types and circumstances. FIGS. 5-8 are screen captures illustrating a user interface for billable items while FIGS. 9-12 are screen captures illustrating a user interface for consumption items.

Figure 5:
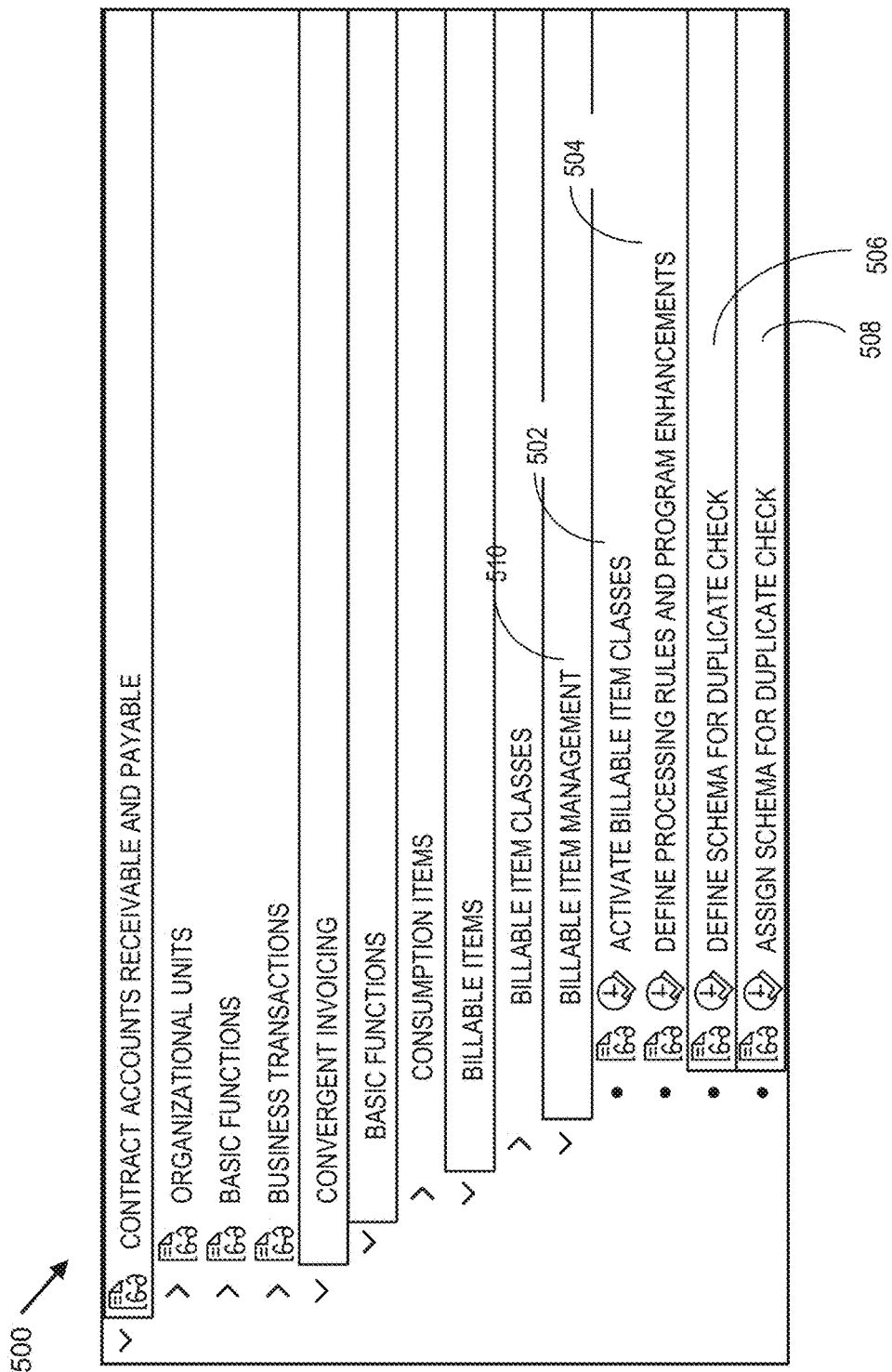
FIG. 5 is a screen capture illustrating a user interface presenting a list of tasks for an administrator to perform to set up management of billing items, in accordance with an example embodiment.

Referring first to FIG. 5, FIG. 5 is a screen capture illustrating a user interface 500 presenting a list of tasks for an administrator to perform to set up management of billing items, in accordance with an example embodiment. Here, various tasks 502-508 are listed, organized into classes. Here, all the tasks 502-508 relate to billable item management 510. The administrator is able to select, for example, task 506, which pertains to defining schema for duplicate check, and then be presented with a user interface for defining the schema for the duplicate check.

Figure 6:
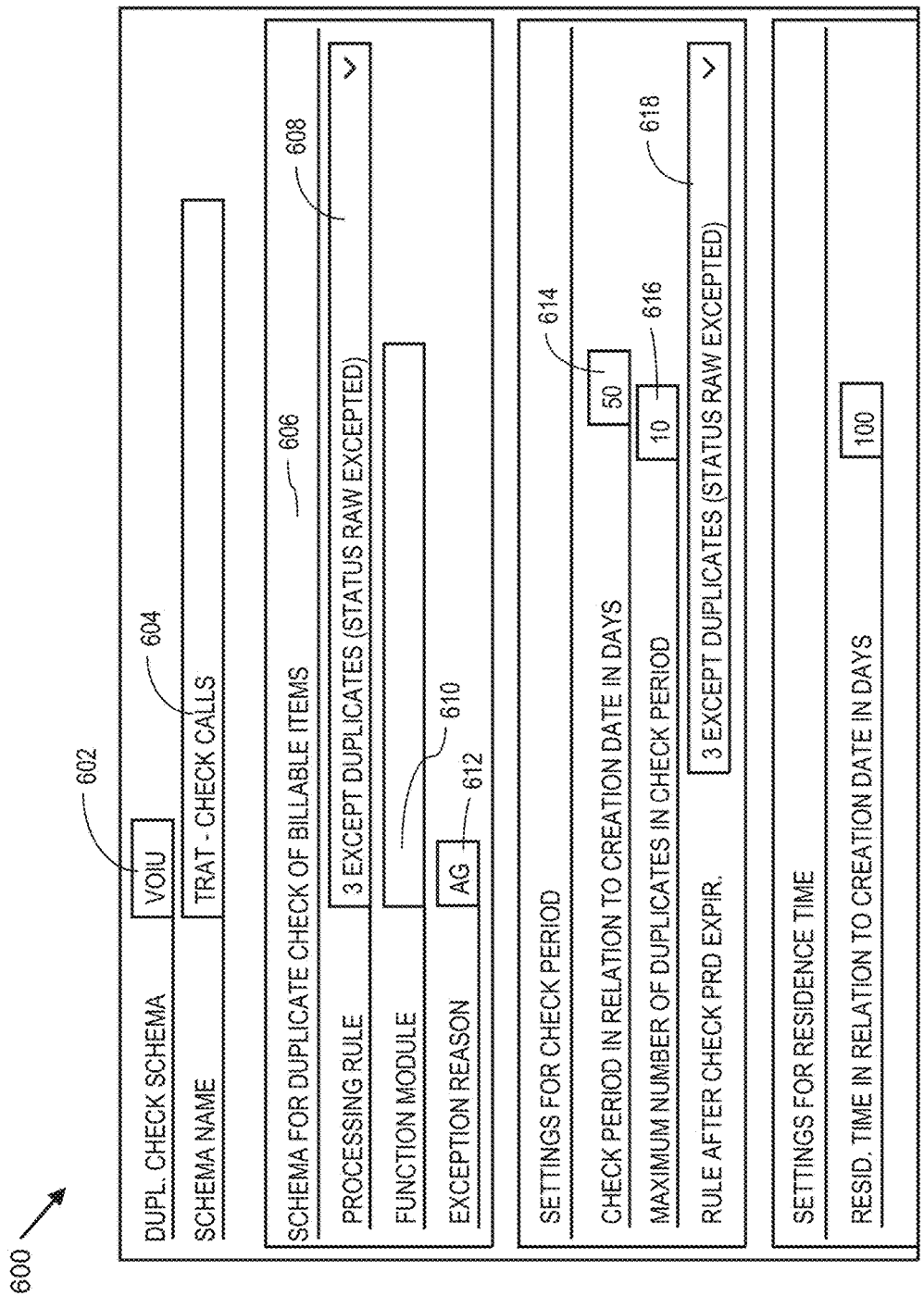
FIG. 6 is a screen capture illustrating a user interface for defining the schema for the duplicate check in accordance with an example embodiment.

FIG. 6 is a screen capture illustrating a user interface 600 for defining the schema for the duplicate check in accordance with an example embodiment. Here, the user interface 600 shows an identification 602 for the duplicate check schema as well as a text box 604 where the administrator can enter a name for the schema. Additionally the user interface 600 depicts an area 606 where the administrator can select various options for treatment of a billing item once it is identified as a duplicate, including setting a processing rule 608, specifying a function module 610, and providing an exception reason 612. The administrator can then set various settings for the duplicate check associated with the schema, including the period in days when the duplicate check should be performed (in relation to creation date) 614, a maximum number of duplicates that can be found in the check period 616, and the rule applied after the check period expires 618. A maximum number of duplicates can be set to avoid the situation where a processing error incorrectly finds a large number of duplicates, which can happen in certain circumstances. The assumption may be that if there is a large number of duplicates, then it is likely that these are false positives. The administrator may then proceed to specify the fields to be included in the hash function for each record.

Figure 7:
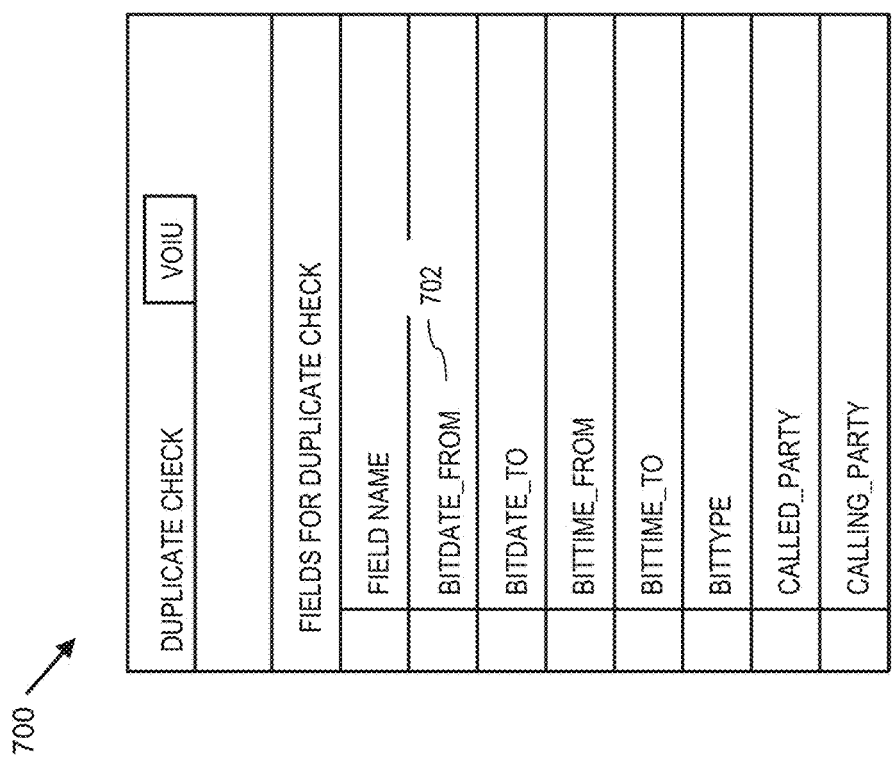
FIG. 7 is a screen capture illustrating a user interface for specifying fields for examination during the duplicate check, in accordance with an example embodiment.

FIG. 7 is a screen capture illustrating a user interface 700 for specifying fields for examination during the duplicate check, in accordance with an example embodiment. Here, the administrator can enter field names 702 for fields in billable items that should be hashed by the hash function (and thus that are ultimately used in determining whether a duplicate is found). This allows, for example, the administrator to specify fields that are custom, and thus that would not be available or known if a static duplicate check policy were utilized.

Figure 8:
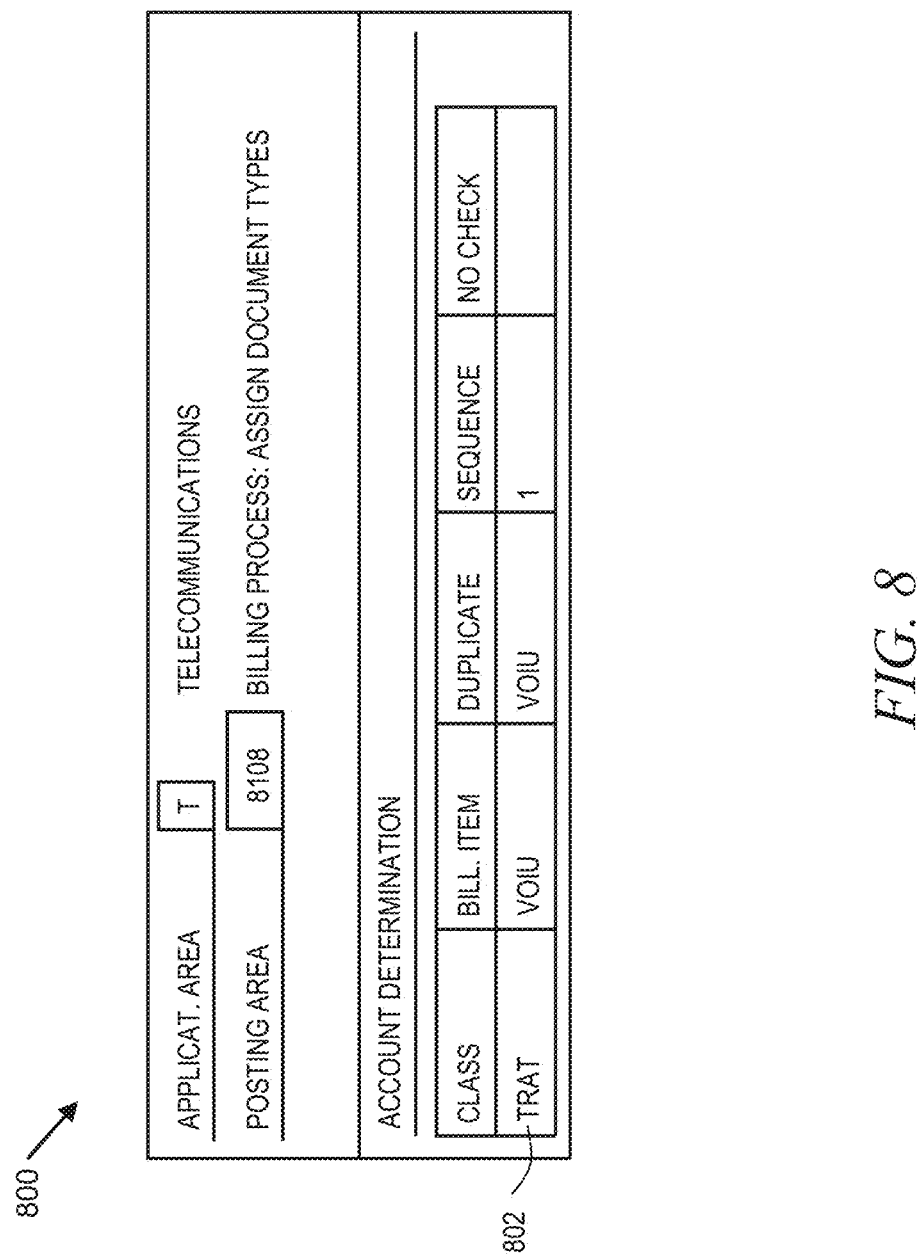
FIG. 8 is a screen capture illustrating a user interface for specifying various options to assign a schema via posting areas.

FIG. 8 is a screen capture illustrating a user interface 800 for specifying various options to assign a schema via posting areas. Here, the administrator can indicate that the TRAT 802 class of BITs should be assigned the schema. The administrator can assign a different schema, for example, to a different class of BITs.

Figure 9:
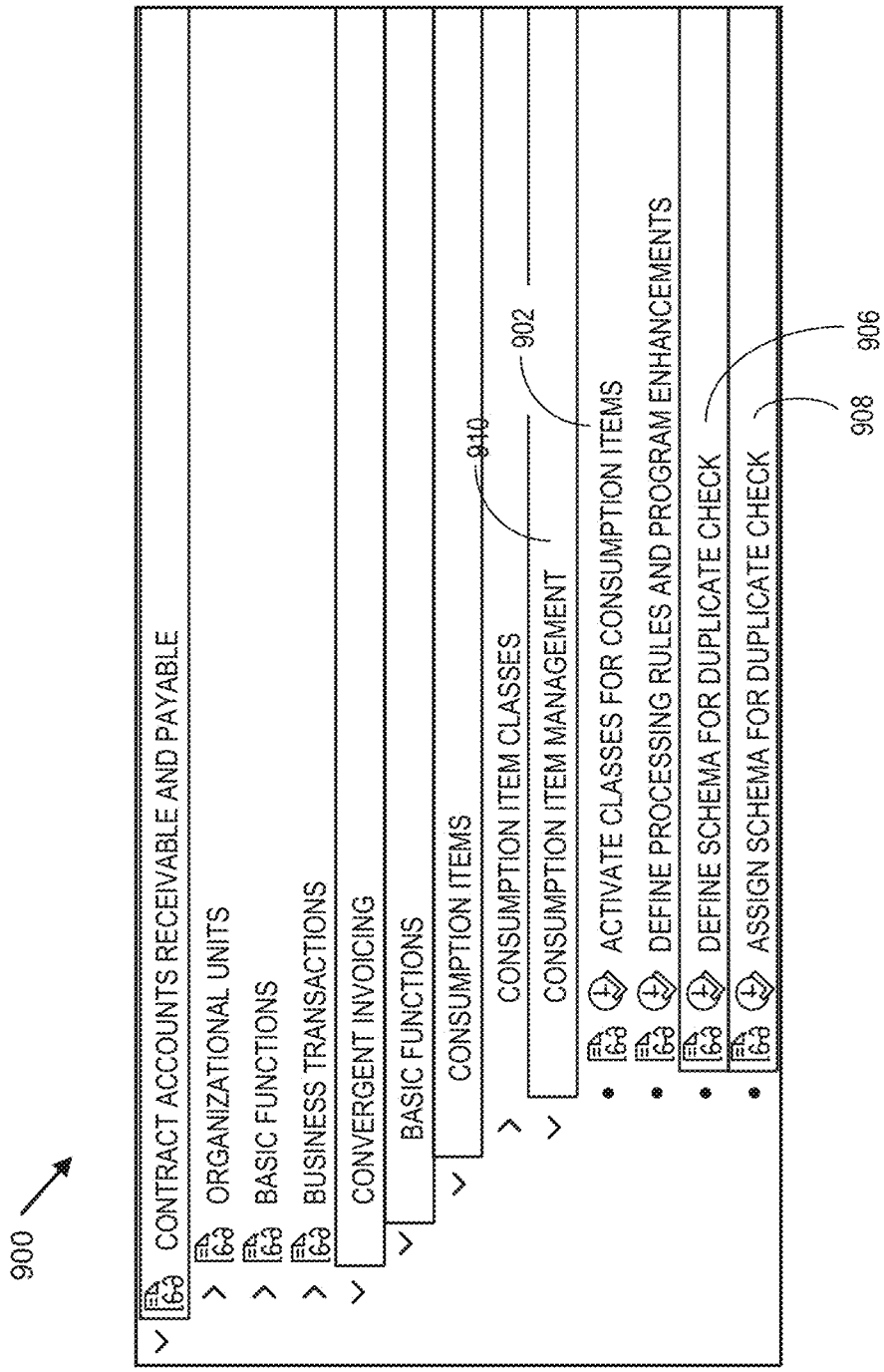
FIG. 9 is a screen capture illustrating a user interface presenting a list of tasks for an administrator to perform to set up management of consumption items, in accordance with an example embodiment.

FIG. 9 is a screen capture illustrating a user interface 900 presenting a list of tasks for an administrator to perform to set up management of consumption items, in accordance with an example embodiment. Here, various tasks 902-908 are listed, organized into classes. Here, all the tasks 902-908 relate to consumption item management 910. The administrator is able to select, for example, task 906, which pertains to defining schema for duplicate check, and then be presented with a user interface for defining the schema for the duplicate check.

Figure 10:
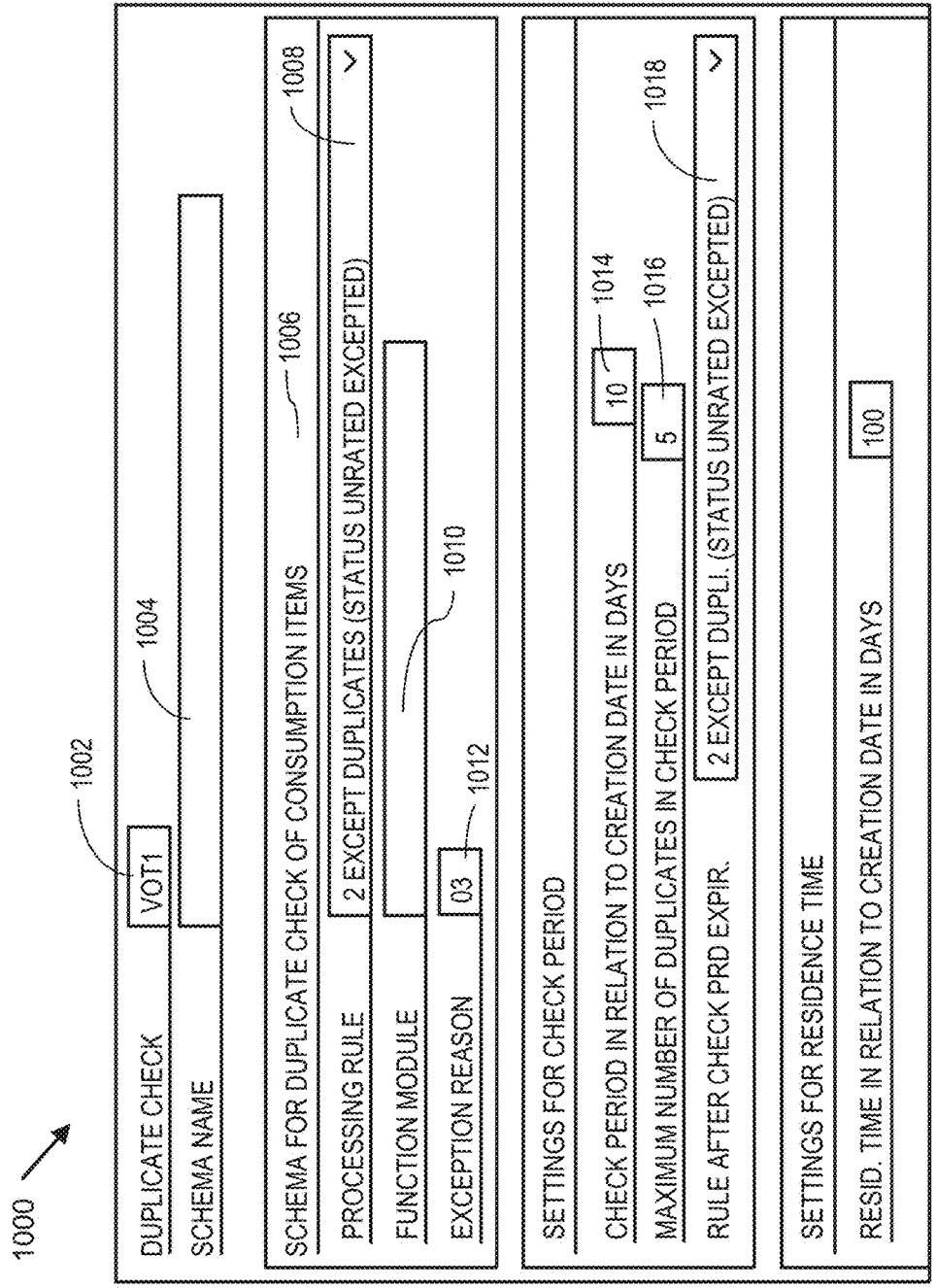
FIG. 10 is a screen capture illustrating a user interface for defining the schema for the duplicate check in accordance with an example embodiment.

FIG. 10 is a screen capture illustrating a user interface 1000 for defining the schema for the duplicate check in accordance with an example embodiment. Here, the user interface 1000 shows an identification 1002 for the duplicate check schema as well as a text box 1004 where the administrator can enter a name for the schema. Additionally the user interface 1000 depicts an area 1006 where the administrator can select various options for treatment of a consumption item once it is identified as a duplicate, including setting a processing rule 1008, specifying a function module 1010, and providing an exception reason 1012. The administrator can then set various settings for the duplicate check associated with the schema, including the period in days when the duplicate check should be performed (in relation to creation date) 1014, a maximum number of duplicates that can be found in the check period 1016, and the rule applied after the check period expires 1018. The maximum number of duplicates can be set to avoid the situation where a processing error incorrectly finds a large number of duplicates, which can happen in certain circumstances. The assumption may be that if there is a large number of duplicates, then it is likely that these are false positives. The administrator may then proceed to specify the fields to be included in the hash function for each record.

Figure 11:
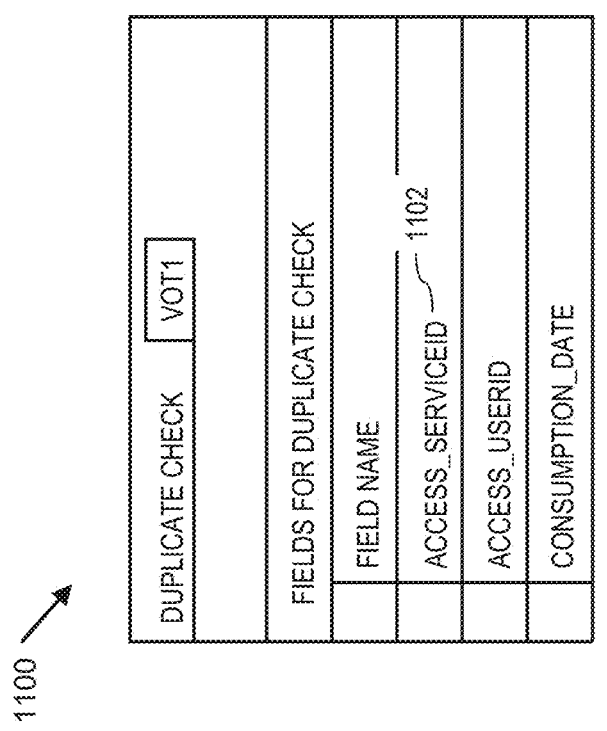
FIG. 11 is a screen capture illustrating a user interface for specifying fields for examination during the duplicate check, in accordance with an example embodiment.

FIG. 11 is a screen capture illustrating a user interface 1100 for specifying fields for examination during the duplicate check, in accordance with an example embodiment. Here, the administrator can enter field names 1102 for fields in consumption items that should be hashed by the hash function (and thus that are ultimately used in determining whether a duplicate is found). This allows, for example, the administrator to specify fields that are custom, and thus that would not be available or known if a static duplicate check policy were utilized.

Figure 12:
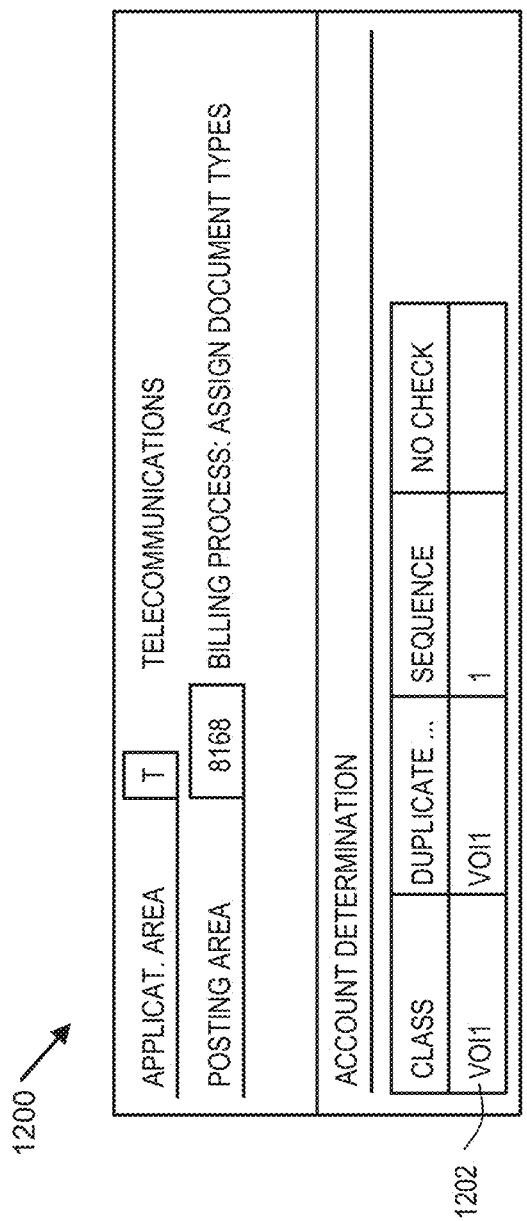
FIG. 12 is a screen capture illustrating a user interface for specifying various options to assign a schema via posting areas.

FIG. 12 is a screen capture illustrating a user interface 1200 for specifying various options to assign a schema via posting areas. Here, the administrator can indicate that the VOI1 1202 class of CITs should be assigned the schema. The administrator can assign a different schema, for example, to a different class of CITs.

FIG. 13 is a diagram illustrating a schema table 1300 in accordance with an example embodiment. This schema table 1300 represents a schema defined for a BIT, such as a schema defined using the user interfaces of FIGS. 5-8 described above. The schema table 1300 has three fields 1302-1306, each defining a different aspect of the schema. Field 1302 defines key fields for the schema. Key fields are fields that may be used as keys for other tables. Field 1304 defines data fields. The data fields correspond to fields used by the hashing algorithm when creating the hash for a particular BIT. Fields 1306 define secondary indexes. Secondary indexes are created by developers to improve data retrieval and generally result in increased performance and reduced load on the database when used in conjunction with a primary index.

Figure 14:
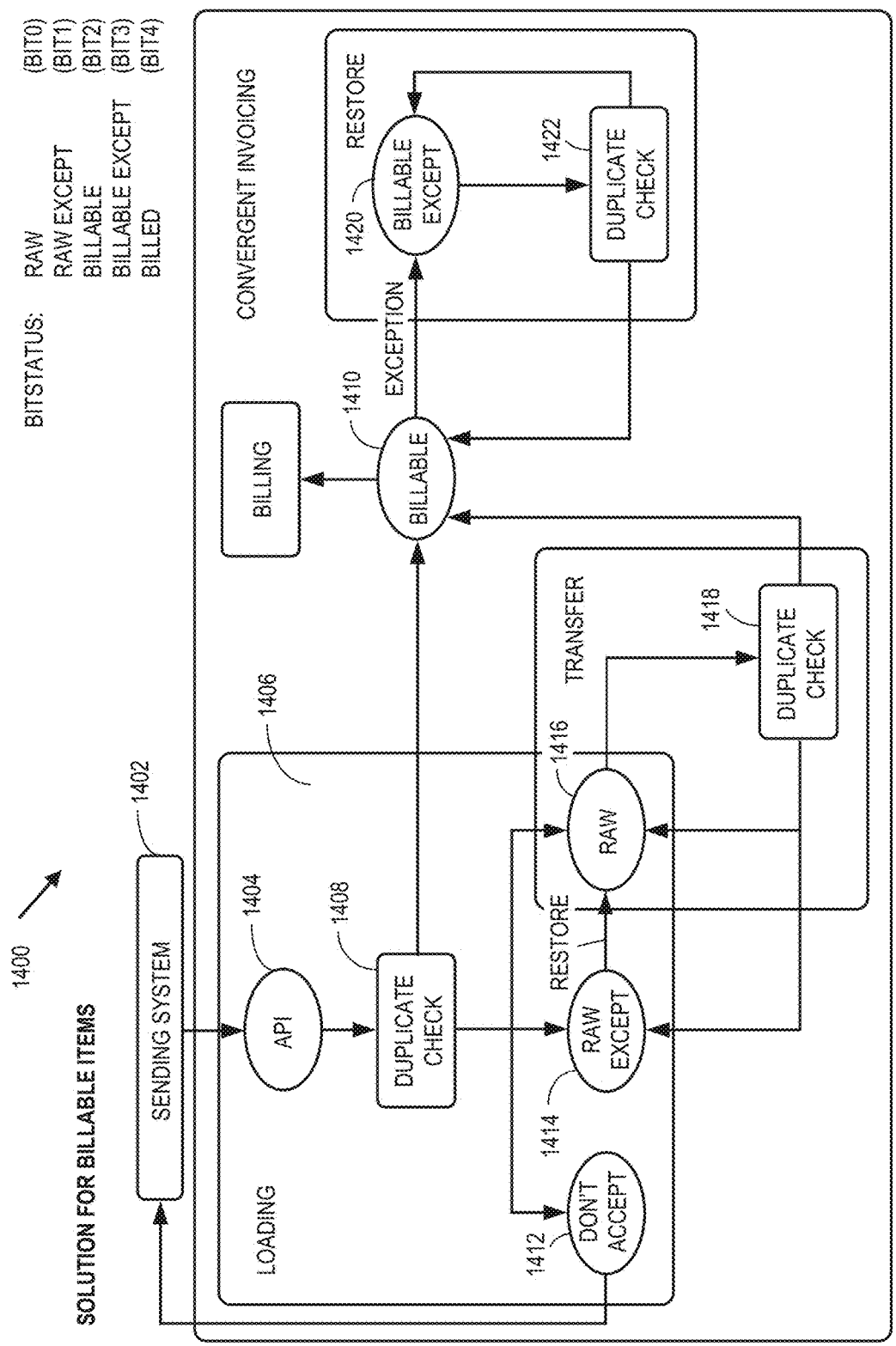
FIG. 14 is a process flow diagram illustrating a flow for a duplicate check for billable items in accordance with an example embodiment.

FIG. 14 is a process flow diagram illustrating a flow 1400 for a duplicate check for billable items in accordance with an example embodiment. A sending system 1402 sends billable items through an API 1404 to a loading module 1406, which performs a duplicate check 1408 on the billable items. For each billable item, four possible states exist: billable 1410, don't accept 1412, raw except 1414, and raw 1416. If the item passes the duplicate check 1408, then the state may be changed to billable 1410. If not, the item may be processed in accordance with the defined schema for this class of item. This may include, for example, automatically labeling the item as don't accept 1412, which indicates the item should not be processed further, or automatically classifying the item as raw except 1414, which allows for the possibility of the user electing to allow the item to be processed further through a restore function, which alters the state to raw 1416 and alters the hash value for the item so that a subsequent duplicate check 1418 does not continue to evaluate the item as a duplicate.

It should be noted that even once the item has transitioned to the billable 1410 state, it is possible that an exception may be raised in response to a rule evaluation that may change the state to billable except 1420. If this item is then restored, then yet another duplicate check 1422 may be performed.

It should also be noted that while this diagram depicts three different duplicate checks 1408, 1418, 1422, the underlying processes of these duplicate checks 1408, 1418 1422 may be identical, except that in certain circumstances the hash value may be deliberately altered prior to the duplicate check 1408, 1418, 1422 if it is a recheck to ensure a different result is obtained.

Figure 15:
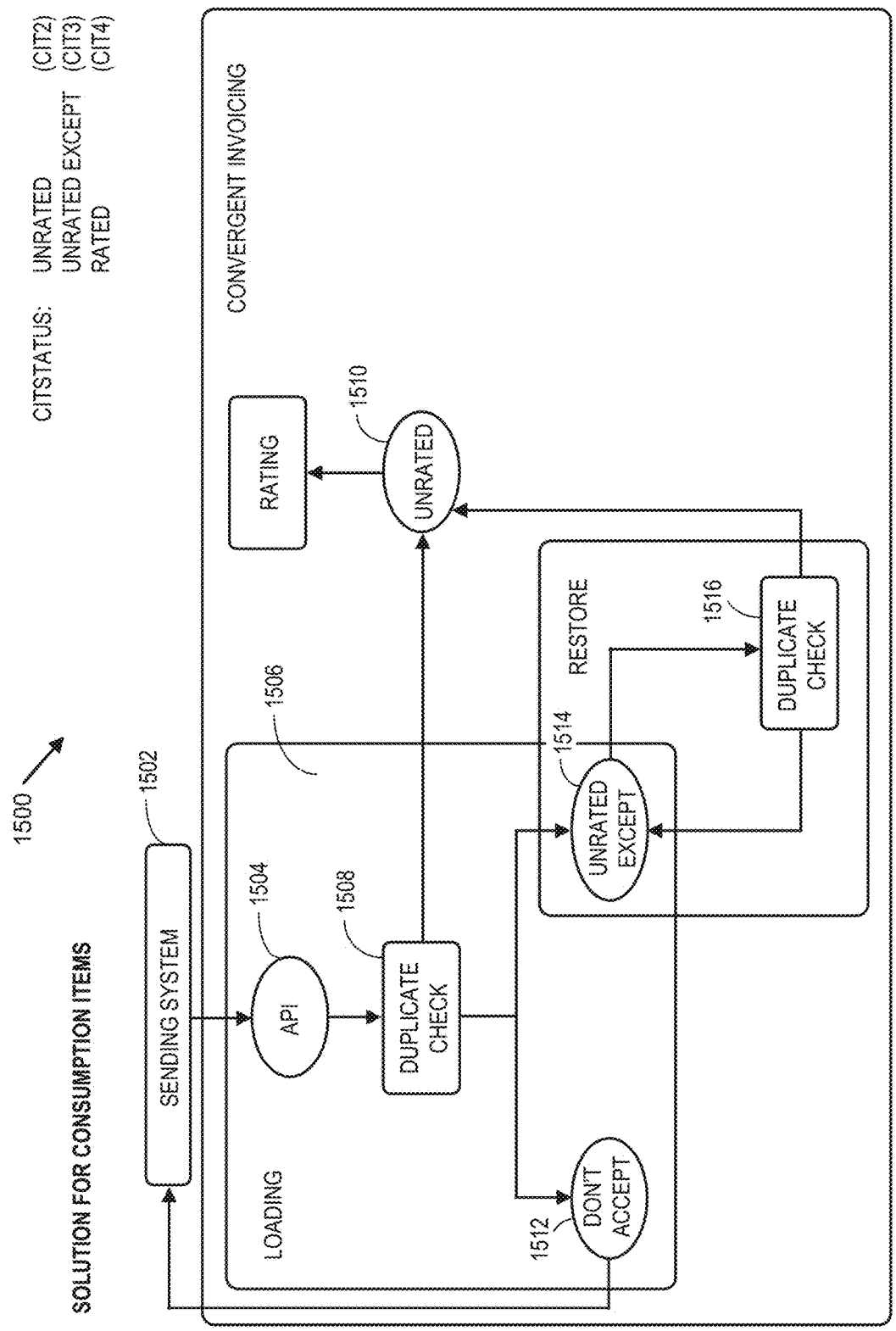
FIG. 15 is a process flow diagram illustrating a flow for a duplicate check for consumption items in accordance with an example embodiment.

FIG. 15 is a process flow diagram illustrating a flow 1500 for a duplicate check for consumption items in accordance with an example embodiment. A sending system 1502 sends consumption items through an API 1504 to a loading module 1506, which performs a duplicate check 1508. The possible states here are unrated 1510, don't accept 1512, and unrated except 1514. If the item passes the duplicate check 1508, then the state may be changed to unrated 1510. If not, the item may be processed in accordance with the defined schema for this class of item. This may include, for example, automatically labeling the item as don't accept 1512, which indicates the item should not be processed further, or automatically classifying the item as unrated except 1514, which allows for the possibility of the user electing to allow the item to be processed further through a restore function which alters the hash value for the item for a subsequent duplicate check 1516 so that the item does not continue to be evaluated as a duplicate.

Figure 16:
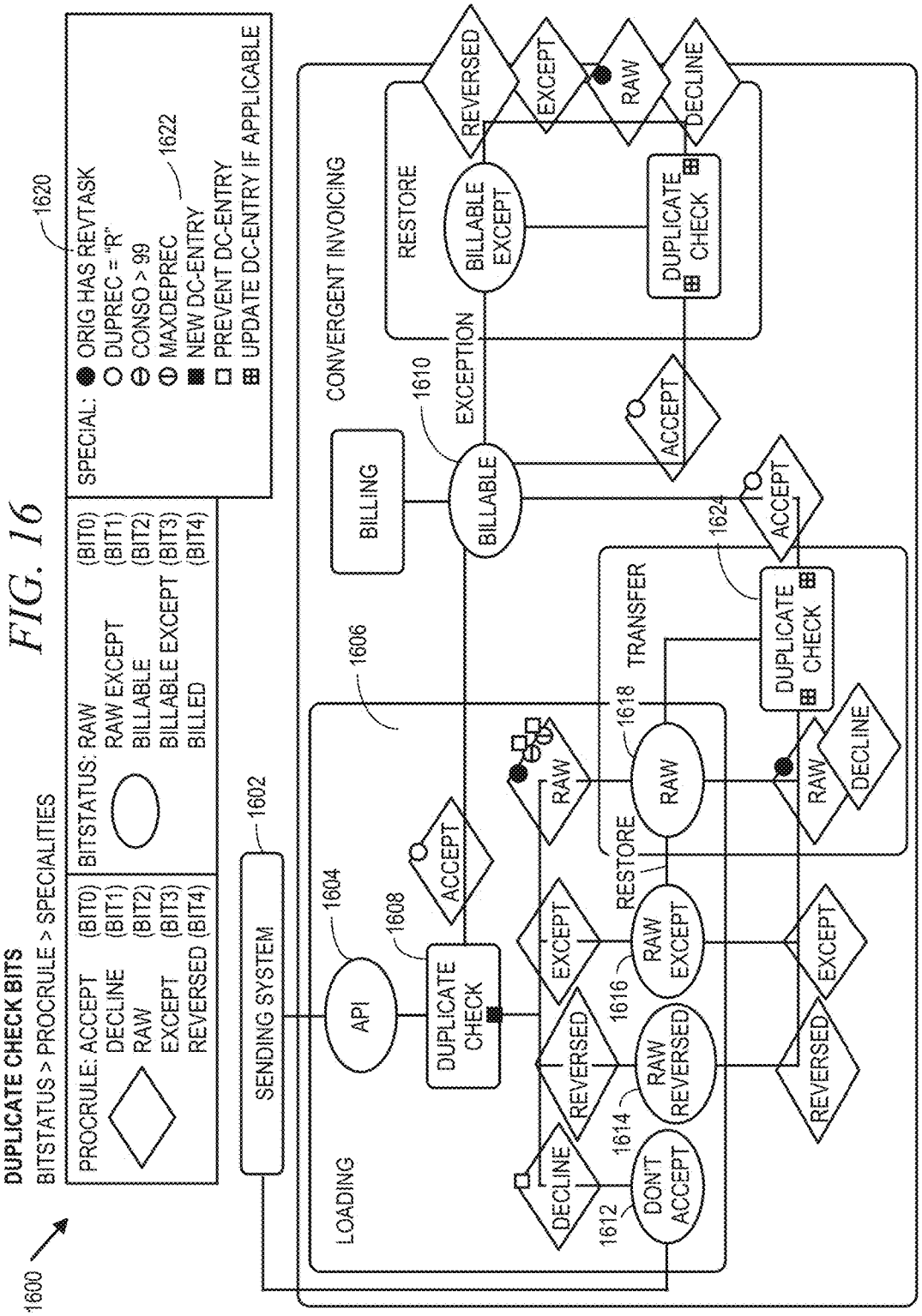
FIG. 16 is a process flow diagram illustrating a flow for a duplicate check for billable items in accordance with another example embodiment.

FIG. 16 is a process flow diagram illustrating a flow 1600 for a duplicate check for billable items in accordance with another example embodiment. A sending system 1602 sends billable items through an API 1604 to a loading module 1606, which performs a duplicate check 1608 on the billable items. For each billable item, five possible states exist: billable 1610, don't accept 1612, raw reversed 1614, raw except 1616, and raw 1618. If the item passes the duplicate check 1608 (e.g., "accept"), then the state may be changed to billable 1610. If not, the item may be processed in accordance with the defined schema for this class of item.

This may include, for example, presenting a user interface where the user can elect the state for the item. If the user declines (essentially admitting the billable item is indeed a duplicate), then the flow 1600 may enter the don't accept 1612 state, labeling the item as don't accept 1612, which indicates the item should not be processed further. The raw 1618 state may be encountered if one of a plurality of defined checks results in a trigger being fired. Here, three triggers are identified. The first trigger 1620 fires if the original item is labeled as being marked to be reversed. The second trigger 1622 fires if the number of total duplicates is a maximum threshold. The user can also elect to reverse the billing item, which results in the raw reversed 1614 state, where the item will be labeled as reversed. If none of these occurs, the raw except state 1616 may be encountered, which allows for the possibility of the user electing to allow the item to be processed further through a restore function which alters the state to raw 1618 and alters the hash value for the item so that a subsequent duplicate check 1624 does not continue to evaluate the item as a duplicate.

Figure 17:
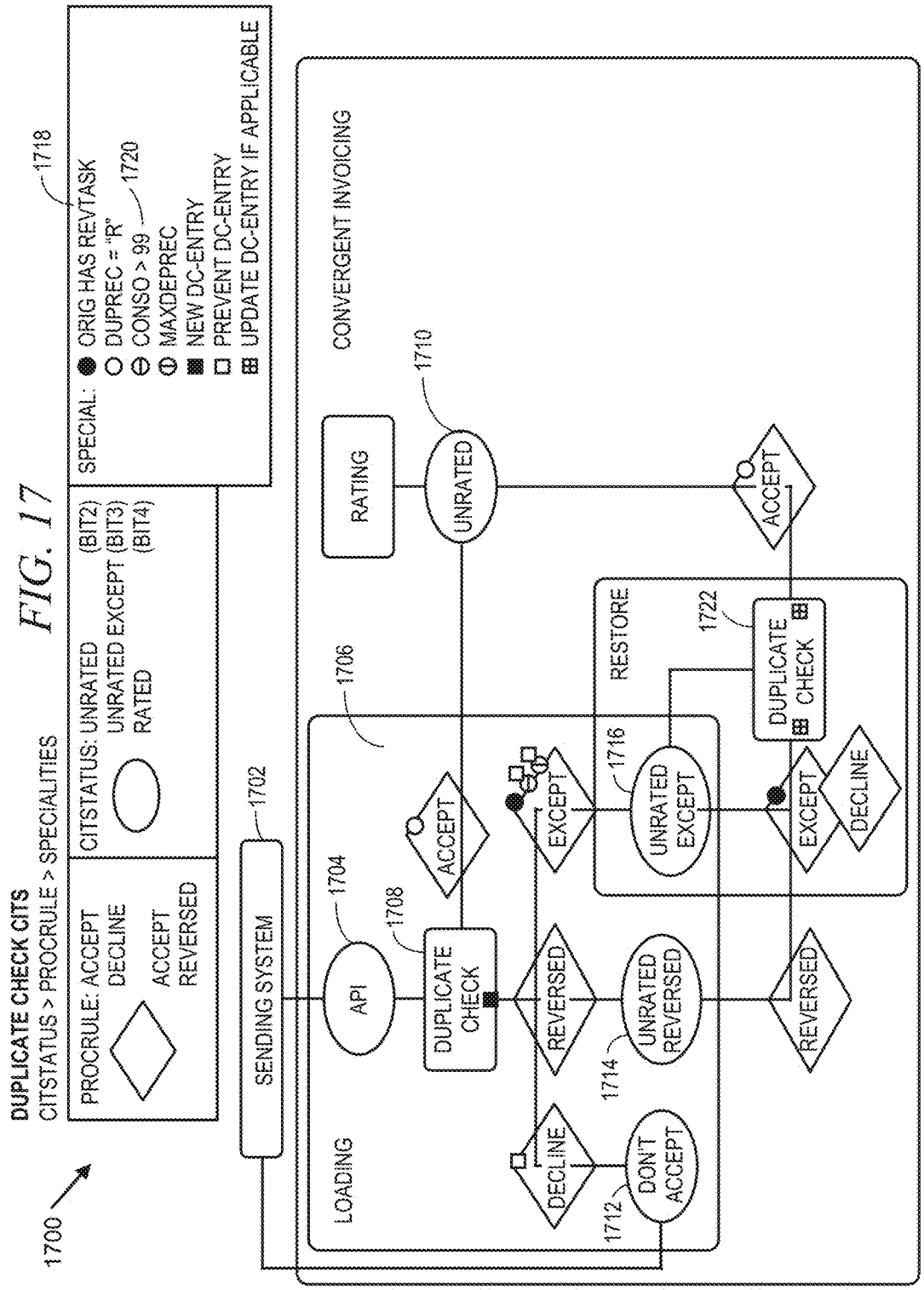
FIG. 17 is a process flow diagram illustrating a flow for a duplicate check for consumption items in accordance with another example embodiment.

FIG. 17 is a process flow diagram illustrating a flow 1700 for a duplicate check for consumption items in accordance with another example embodiment. A sending system 1702 sends billable items through an API 1704 to a loading module 1706, which performs a duplicate check 1708 on the consumption items. For each consumption item, four possible states exist: unrated 1710, don't accept 1712, unrated reversed 1714, and unrated except 1716. If the item passes the duplicate check 1708 (e.g., "accept"), then the state may be changed to unrated 1710. If not, the item may be processed in accordance with the defined schema for this class of item. This may include, for example, presenting a user interface where the user can elect the state for the item. If the user declines (essentially admitting the billable item is indeed a duplicate), then the flow 1700 may enter the don't accept 1712 state, labeling the item as don't accept 1712, which indicates the item should not be processed further. The unrated except 1716 state may be encountered if one of a plurality of defined checks results in a trigger being fired. Here, three triggers are identified. The first trigger 1718 fires if the original item is labeled as beingmarked to be reversed. The second trigger 1720 fires if the number of total duplicates exceeds a maximum threshold. The user can also elect to reverse the consumption item, which results in the raw reversed 1714 state, where the item will be labeled as reversed. In the unrated except state 1716 the user can elect the item to be processed further through a restore function which alters the state to raw and alters the hash value for the item so that a subsequent duplicate check 1722 does not continue to evaluate the item as a duplicate.

Figure 18:
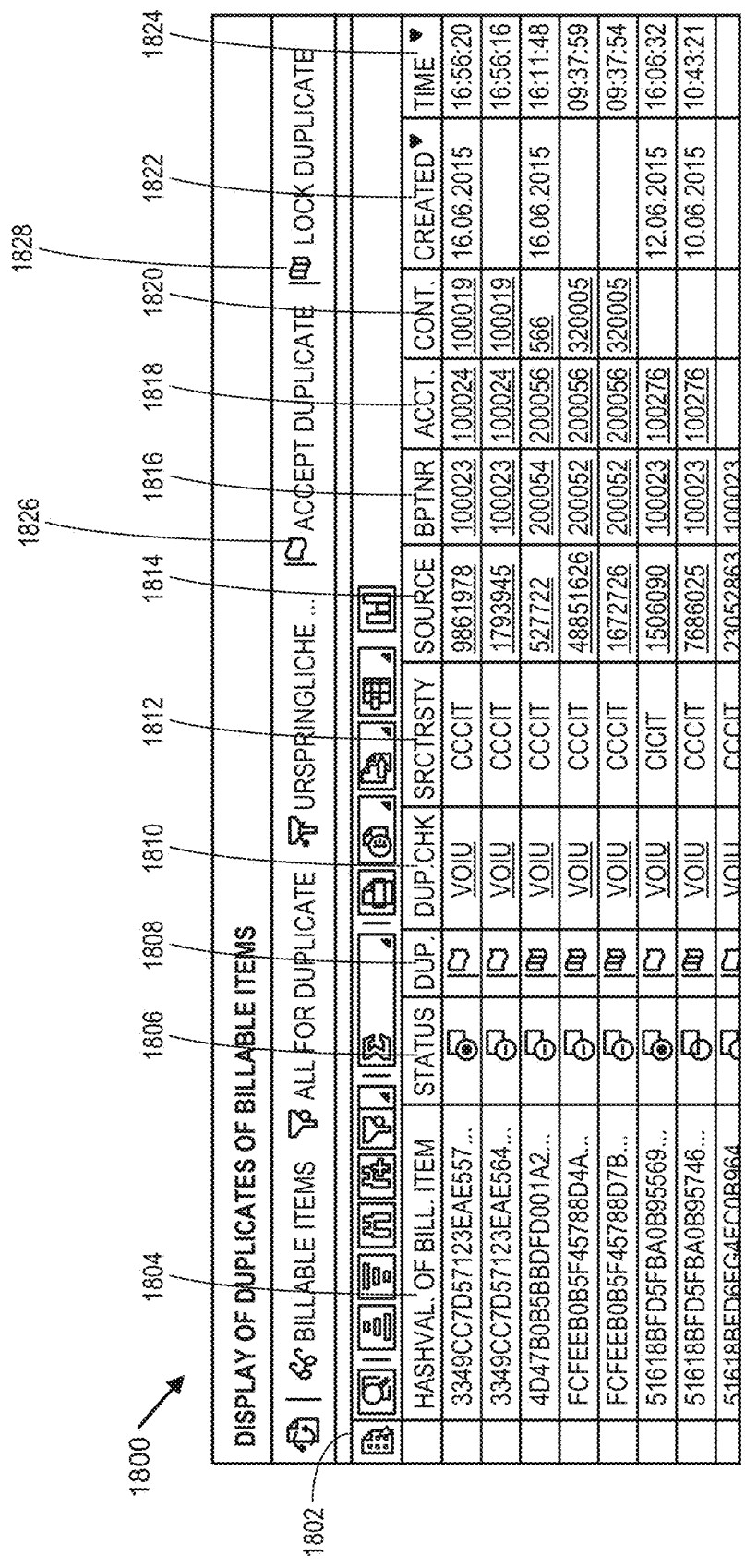
FIG. 18 is a screen capture illustrating a user interface presenting results of a duplicate check for billable items in accordance with an example embodiment.

FIG. 18 is a screen capture illustrating a user interface 1800 presenting results of a duplicate check for billable items in accordance with an example embodiment. The user interface 1800 presents a list of encountered duplicates 1802, including information such as hash value 1804, status 1806, a duplicate flag 1808, schema 1810, source transaction type 1812, source transaction ID 1814, business partner 1816, contract account 1818, contract 1820, date created 1822, and time created 1824. The user may select individual items in the list of encountered duplicates 1802 and indicate whether the duplicate should be accepted using button 1826, or locked using button 1828. A similar user interface may be presented for consumption items.

Figure 19A:
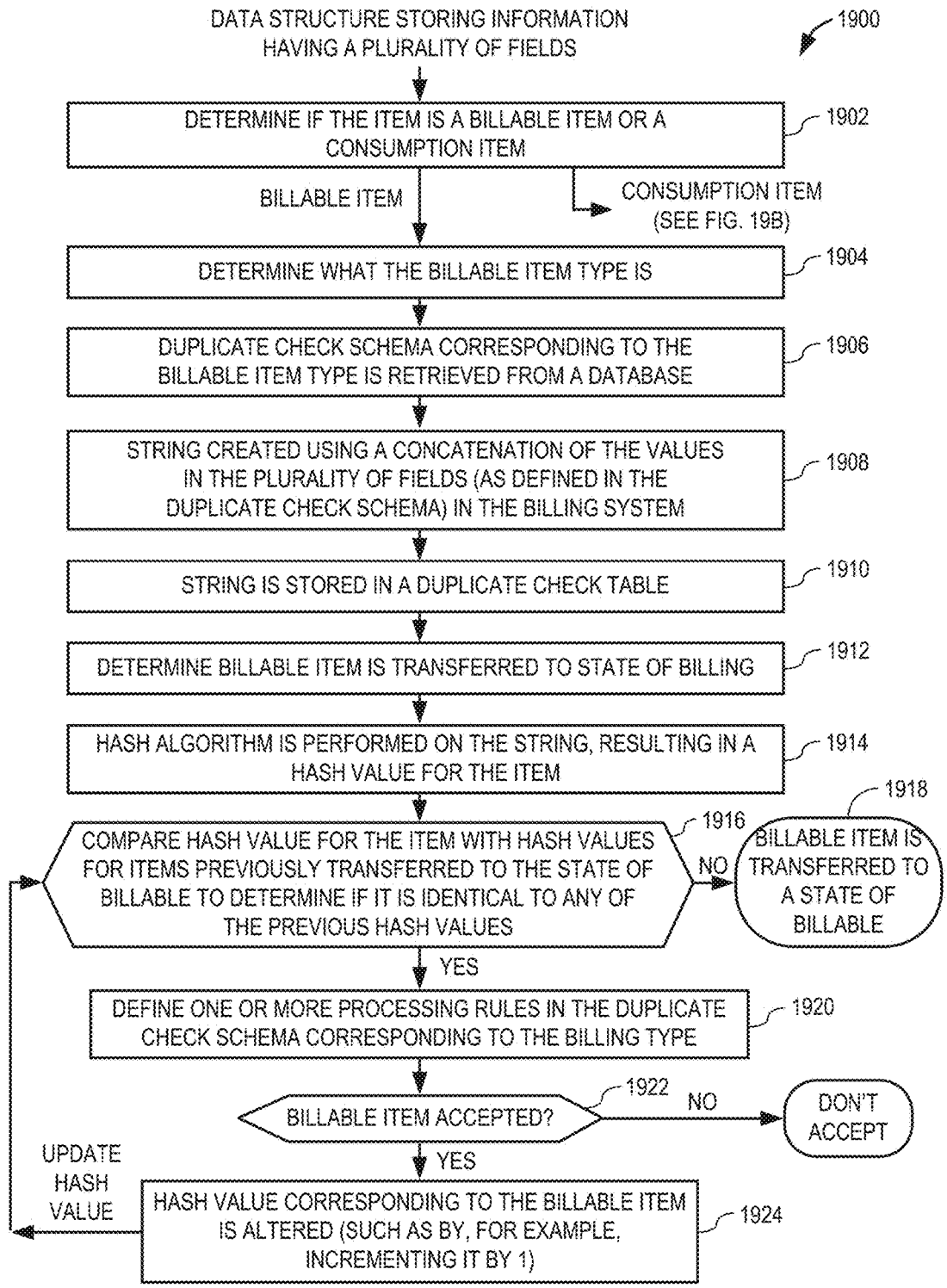
FIGS. 19A and 19B are a flow diagram illustrating a method, in accordance with an example embodiment, for performing a duplicate check on records in a convergent invoicing system.
Figure 19B:
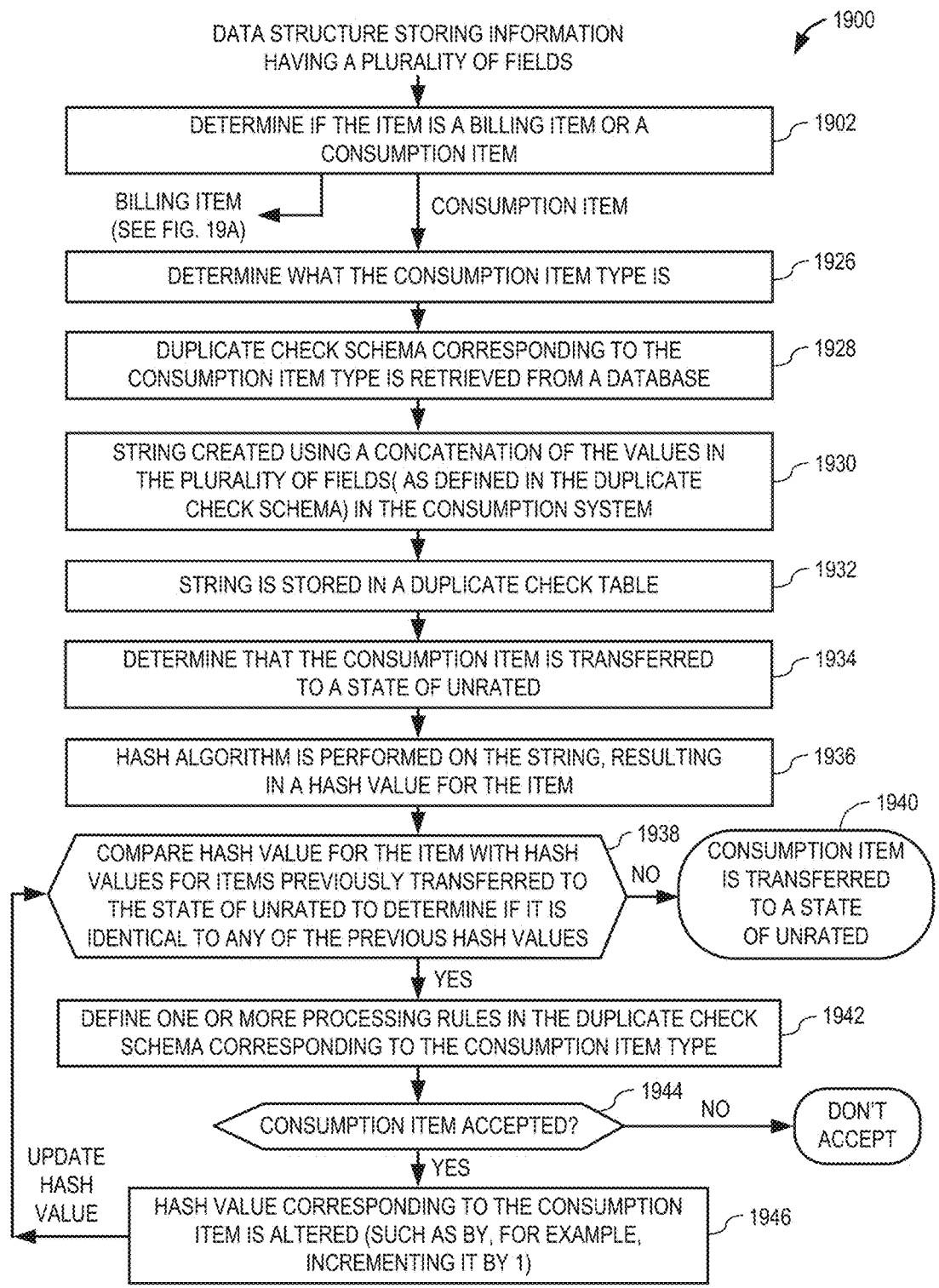

FIGS. 19A and 19B are a flow diagram illustrating a method 1900, in accordance with an example embodiment, for performing a duplicate check on records in a convergent invoicing system. An item is received at a loading module via an API. The item is a data structure storing information having a plurality of fields, such as a record or a table. Referring first to FIG. 19A, at operation 1902, it is determined if the item is a billable item or a consumption item. If it is a billable item, then at operation 1904 is determined what the billable item type for the item is. Then, at operation 1906, a duplicate check schema corresponding to the billable item type is retrieved from a database. The duplicate check schema may define a number of different attributes of a duplicate check to be performed on items of the billable item type. Examples are described in more detail above. However, the duplicate check schema also identifies a plurality of fields on which the duplicate check is performed. This plurality of fields can include default or standard fields, user-created fields, or any combination thereof. At operation 1908, a string is created using a concatenation of the values in the plurality of fields (as defined in the duplicate check schema) in the billable item. At operation 1910, this string is stored in, for example, a duplicate check table. At the data structure level, the duplicate check table may be represented as a table with a field for the hash value and a field for the technical key for the item (which indicates how to identify the item in a separate table, such as an item table).

At operation 1912, it is determined that the billable item is transferred to a state of billable. Upon this determination, at operation 1914 a hash algorithm is performed on the string, resulting in a hash value for the item. At operation 1916, the hash value for the item is compared with hash values for items previously transferred to the state of billable to determine if it is identical to any of those previous hash values. If not, then at operation 1918 the billable item is transferred to a state of billable. If so, then at operation 1920 one or more processing rules defined in the duplicate check schema corresponding to the billable item type are executed. These rules may include, for example, presenting a user interface to a user allowing the user to accept the billable item despite the detected duplication. At operation 1922 it is determined if the billable item is to be accepted. If so, then at operation 1924 the hash value corresponding to the billable item is altered (such as by, for example, incrementing it by 1). Then the duplicate check is reexecuted at operation 1916 with the updated hash value.

If at operation 1922 it is determined that the billable item is not to be accepted, then it is transferred to the state of don't accept and the process ends.

Referring now to FIG. 19B, if at operation 1902 it is determined that the item is a consumption item, then at operation 1926, it is determined what the consumption item type for the item is. Then, at operation 1928, a duplicate check schema corresponding to the consumption item type is retrieved from a database. The duplicate check schema may define a number of different attributes of a duplicate check to be performed on items of the consumption item type. Examples are described in more detail above. However, the duplicate check schema also identifies a plurality of fields on which the duplicate check is performed. These plurality of fields can include default or standard fields, user-created fields, or any combination thereof. At operation 1930, a string is created using a concatenation of the values in the plurality of fields (as defined in the duplicate check schema) in the consumption item. At operation 1932, this string is stored in, for example, a duplicate check table. At the data structure level, the duplicate check table may be represented as a table with a field for the hash value and a field for the technical key for the item (which indicates how to identify the item in a separate table, such as an item table).

At 1934, it is determined that the consumption item is transferred to a state of unrated. Upon this determination, at operation 1936 a hash algorithm is performed on the string, resulting in a hash value for the item. At operation 1938, the hash value for the item is compared with hash values for items previously transferred to the state of unrated to determine if it is identical to any of those previous hash values. If not, then at operation 1940 the consumption item is transferred to a state of unrated. If so, then at operation 1942 one or more processing rules defined in the duplicate check schema corresponding to the consumption item type are executed. These rules may include, for example, presenting a user interface to a user allowing the user to accept the consumption item despite the detected duplication. At operation 1944 it is determined if the consumption item is to be accepted. If so, then at operation 1946 the hash value corresponding to the consumption item is altered (such as by, for example, incrementing it by 1). Then the duplicate check is reexecuted at operation 1938 with the updated hash value.

If at operation 1944 it is determined that the billable item is not to be accepted, then it is transferred to the state of don't accept and the process ends.

In another example embodiment, a modification is provided that allows the system to handle cases where the schema itself is altered. For example, an administrator may alter the plurality of fields on which the duplicate check is performed by, for example, swapping out one field with a different field. The result is that there is now an additional version of the schema. As such, in an example embodiment, schema versioning is handled by defining a field in the duplicate check schema that indicates the version of the schema. Additionally, when a hash value is computed and stored in the duplicate check table, an identification of the version that was used to generate the hash value is also stored in the duplicate check table. This is helpful in cases where the duplicate check schema is altered after hash values for prior items have been computed and stored. This also results in a change to the validity of the entries that were already entered in the duplicate check table. Such instances can be handled in multiple ways.

In one example embodiment, a version check occurs prior to comparing the hash value of the present item to a hash value for a prior item. This check compares the duplicate check schema version used to calculate the hash value for the present item to the duplicate check schema version used to calculate the hash value for the prior item. If they are identical, the duplicate check can proceed as described in FIG. 19 and the corresponding text. If not, however, an error may be generated and presented to the administrator alerting them that it is not possible to perform a duplicate check due to the conflicting versions and presenting the administrator with the option to either reverse the change to the duplicate check schema or adjust the existing entries in the duplicate check table by performing the hash algorithm on each of the outdated existing entries using the new duplicate check schema version.

In an example embodiment, the duplicate check schema version identification is simply a number that is incremented upon each change to the duplicate check schema. In another example embodiment, the duplicate check schema is a hash value calculated for the combination of comparison fields of the duplicate check schema.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-19 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Software Architecture

Figure 20:
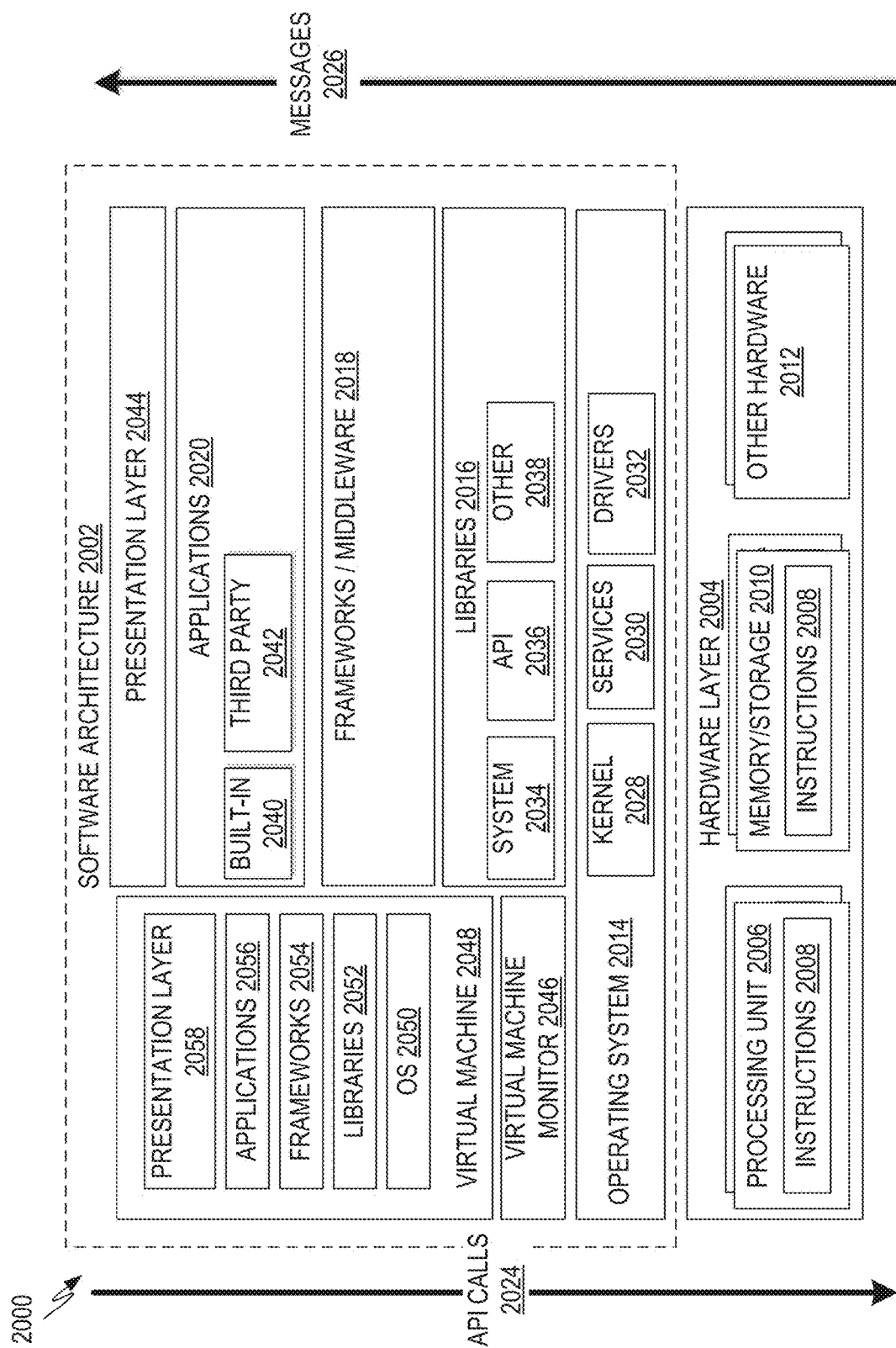
FIG. 20 is a block diagram illustrating a representative software architecture, which may be used in conjunction with various hardware architectures herein described.

FIG. 20 is a block diagram 2000 illustrating a representative software architecture 2002, which may be used in conjunction with various hardware architectures herein described. FIG. 20 is merely a non-limiting example of a software architecture 2002 and it will be appreciated that many other architectures may be implemented to facilitate the functionality described herein. The software architecture 2002 may be executing on hardware such as machine 2100 of FIG. 21 that includes, among other things, processors 2110, memory/storage 2130, and I/O components 2150. A representative hardware layer 2004 is illustrated and can represent, for example, the machine 2100 of FIG. 21. The representative hardware layer 2004 comprises one or more processing units 2006 having associated executable instructions 2008. Executable instructions 2008 represent the executable instructions of the software architecture 2002, including implementation of the methods, modules and so forth of FIGS. 1-19. Hardware layer 2004 also includes memory and/or storage modules 2010, which also have executable instructions 2008. Hardware layer 2004 may also comprise other hardware 2012 which represents any other hardware of the hardware layer 2004, such as the other hardware illustrated as part of machine 2100.

In the example architecture of FIG. 20, the software architecture 2002 may be conceptualized as a stack of layers where each layer provides particular functionality. For example, the software architecture 2002 may include layers such as an operating system 2014, libraries 2016, frameworks/middleware 2018, applications 2020 and presentation layer 2044. Operationally, the applications 2020 and/or other components within the layers may invoke application programming interface (API) calls 2024 through the software stack and receive a response, returned values, and so forth illustrated as messages 2026 in response to the API calls 2024. The layers illustrated are representative in nature and not all software architectures have all layers. For example, some mobile or special purpose operating systems may not provide a frameworks/middleware 2018, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. The drivers 2032 may be responsible for controlling or interfacing with the underlying hardware. For instance, the drivers 2032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2016 may provide a common infrastructure that may be utilized by the applications 2020 and/or other components and/or layers. The libraries 2016 typically provide functionality that allows other software modules to perform tasks in an easier fashion than to interface directly with the underlying operating system 2014 functionality (e.g., kernel 2028, services 2030 and/or drivers 2032). The libraries 2016 may include system libraries 2034 (e.g., C standard library) that may provide functions such as memory allocation functions, string manipulation functions, mathematic functions, and the like. In addition, the libraries 2016 may include API libraries 2036 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 2016 may also include a wide variety of other libraries 2038 to provide many other APIs to the applications 2020 and other software components/modules.

The frameworks/middleware 2018 (also sometimes referred to as middleware) may provide a higher-level common infrastructure that may be utilized by the applications 2020 and/or other software components/modules. For example, the frameworks/middleware 2018 may provide various graphic user interface (GUI) functions, high-level resource management, high-level location services, and so forth. The frameworks/middleware 2018 may provide a broad spectrum of other APIs that may be utilized by the applications 2020 and/or other software components/modules, some of which may be specific to a particular operating system or platform.

The applications 2020 include built-in applications 2040 and/or third-party applications 2042. Examples of representative built-in applications 2040 may include, but are not limited to, a contacts application, a browser application, a book reader application, a location application, a media application, a messaging application, and/or a game application. Third-party applications 2042 may include any of the built-in applications 2040 as well as a broad assortment of other applications. In a specific example, the third-party application 2042 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 2042 may invoke the API calls 2024 provided by the mobile operating system such as operating system 2014 to facilitate functionality described herein.

The applications 2020 may utilize built-in operating system functions (e.g., kernel 2028, services 2030 and/or drivers 2032), libraries (e.g., system libraries 2034, API libraries 2036, and other libraries 2038), frameworks/middleware 2018 to create user interfaces to interact with users of the system. Alternatively, or additionally, in some systems, interactions with a user may occur through a presentation layer, such as presentation layer 2044. In these systems, the application/module "logic" can be separated from the aspects of the application/module that interact with a user.

Some software architectures utilize virtual machines. In the example of FIG. 20, this is illustrated by virtual machine 2048. A virtual machine creates a software environment where applications/modules can execute as if they were executing on a hardware machine (such as the machine of FIG. 21, for example). A virtual machine is hosted by a host operating system (operating system 2014 in FIG. 21) and typically, although not always, has a virtual machine monitor 2046, which manages the operation of the virtual machine 2048 as well as the interface with the host operating system (i.e., operating system 2014). A software architecture executes within the virtual machine 2048 such as an operating system 2050, libraries 2052, frameworks/middleware 2054, applications 2056 and/or presentation layer 2058. These layers of software architecture executing within the virtual machine 2048 can be the same as corresponding layers previously described or may be different.

Example Machine Architecture and Machine-Readable Medium

Figure 21:
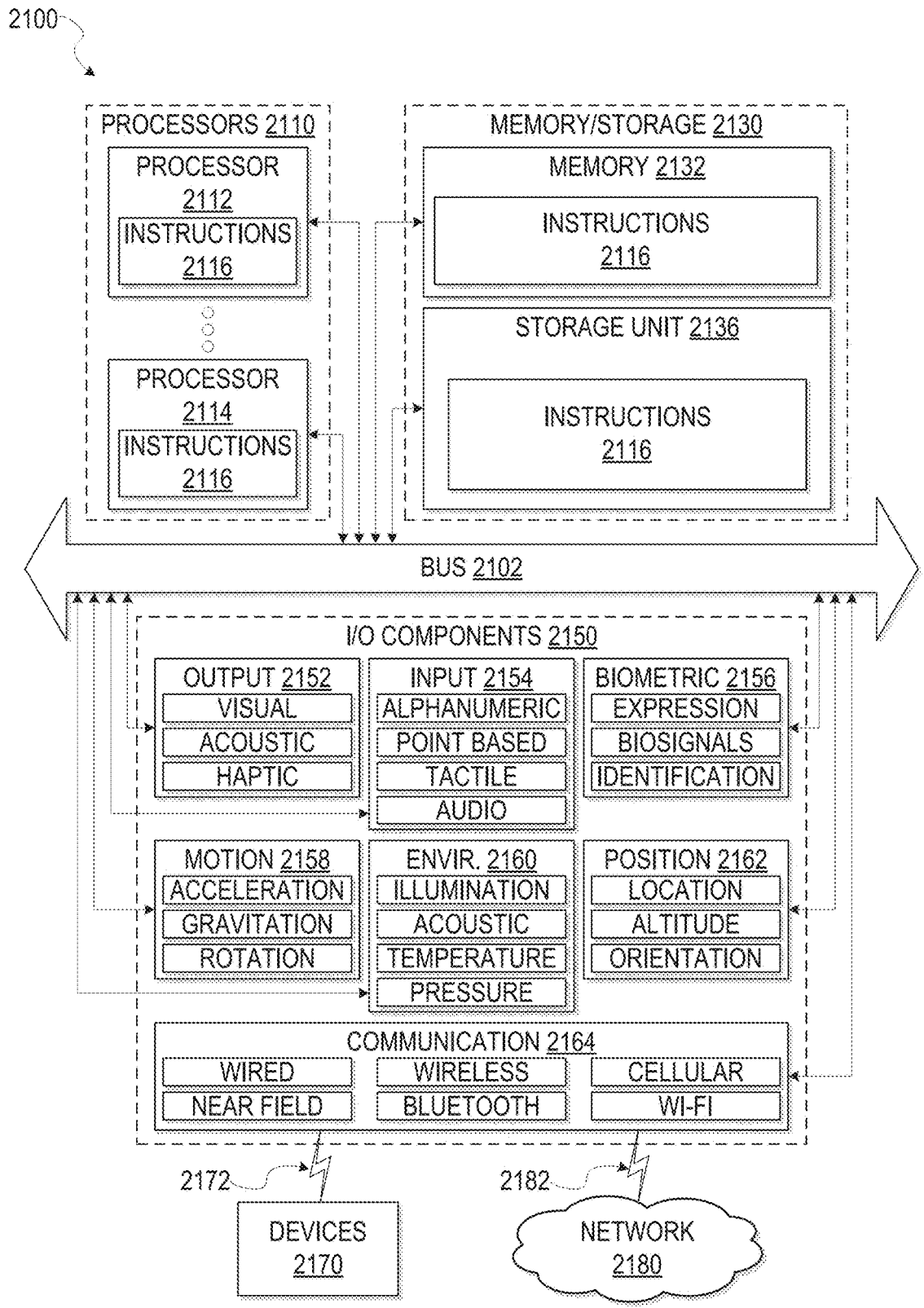
FIG. 21 is a block diagram illustrating components of a machine, according to some example embodiments, able to read instructions from a machine-readable medium (e.g., a machine-readable storage medium) and perform any one or more of the methodologies discussed herein.

FIG. 21 is a block diagram illustrating components of a machine 2100, according to some example embodiments, able to read instructions from a machine-readable medium (e.g., a machine-readable storage medium) and perform any one or more of the methodologies discussed herein. Specifically, FIG. 21 shows a diagrammatic representation of the machine 2100 in the example form of a computer system, within which instructions 2116 (e.g., software, a program, an application, an applet, an app, or other executable code) for causing the machine 2100 to perform any one or more of the methodologies discussed herein may be executed. For example the instructions 2116 may cause the machine 2100 to execute the flow diagrams of FIGS. 1-19. Additionally, or alternatively, the instructions 2116 may implement modules of FIGS. 1-19, and so forth. The instructions 2116 transform the general, non-programmed machine into a particular machine programmed to carry out the described and illustrated functions in the manner described. In alternative embodiments, the machine 2100 operates as a standalone device or may be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2116, sequentially or otherwise, that specify actions to be taken by machine 2100. Further, while only a single machine 2100 is illustrated, the term "machine" shall also be taken to include a collection of machines 2100 that individually or jointly execute the instructions 2116 to perform any one or more of the methodologies discussed herein.

The machine 2100 may include processors 2110, memory/storage 2130, and I/O components 2150, which may be configured to communicate with each other such as via a bus 2102. In an example embodiment, the processors 2110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 2112 and processor 2114 that may execute instructions 2116. The term "processor" is intended to include multi-core processor that may comprise two or more independent processors (sometimes referred to as "cores") that may execute instructions contemporaneously. Although FIG. 21 shows multiple processors 2110, the machine 2100 may include a single processor with a single core, a single processor with multiple cores (e.g., a multi-core process), multiple processors with a single core, multiple processors with multiples cores, or any combination thereof.

The memory/storage 2130 may include a memory 2132, such as a main memory, or other memory storage, and a storage unit 2136, both accessible to the processors 2110 such as via the bus 2102. The storage unit 2136 and memory 2132 store the instructions 2116 embodying any one or more of the methodologies or functions described herein. The instructions 2116 may also reside, completely or partially, within the memory 2132, within the storage unit 2136, within at least one of the processors 2110 (e.g., within the processor's cache memory), or any suitable combination thereof, during execution thereof by the machine 2100. Accordingly, the memory 2132, the storage unit 2136, and the memory of processors 2110 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 2116. The term "machine-readable medium" shall also be taken to include any medium, or combination of multiple media, that is capable of storing instructions (e.g., instructions 2116) for execution by a machine (e.g., machine 2100), such that the instructions, when executed by one or more processors of the machine 2100 (e.g., processors 2110), cause the machine 2100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2150 may include a wide variety of components to receive input, provide output, produce output, transmit information, exchange information, capture measurements, and so on. The specific I/O components 2150 that are included in a particular machine will depend on the type of machine. For example, portable machines such as mobile phones will likely include a touch input device or other such input mechanisms, while a headless server machine will likely not include such a touch input device. It will be appreciated that the I/O components 2150 may include many other components that are not shown in FIG. 21. The I/O components 2150 are grouped according to functionality merely for simplifying the following discussion and the grouping is in no way limiting. In various example embodiments, the I/O components 2150 may include output components 2152 and input components 2154. The output components 2152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 2150 may include biometric components 2156, motion components 2158, environmental components 2160, or position components 2162 among a wide array of other components. For example, the biometric components 2156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2158 may include acceleration sensor components (e.g., accelerometer), gravitation sensor components, rotation sensor components (e.g., gyroscope), and so forth. The environmental components 2160 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2150 may include communication components 2164 operable to couple the machine 2100 to a network 2180 or devices 2170 via coupling 2182 and coupling 2172 respectively. For example, the communication components 2164 may include a network interface component or other suitable device to interface with the network 2180. In further examples, communication components 2164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2170 may be another machine or any of a wide variety of peripheral devices (e.g., a peripheral device coupled via a Universal Serial Bus (USB)).

Moreover, the communication components 2164 may detect identifiers or include components operable to detect identifiers. For example, the communication components 2164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2164, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 2180 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 2180 or a portion of the network 2180 may include a wireless or cellular network and the coupling 2182 may be a Code Division Multiple Access (CDMA) connection, a Global System for Mobile communications (GSM) connection, or other type of cellular or wireless coupling. In this example, the coupling 2182 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 2116 may be transmitted or received over the network 2180 using a transmission medium via a network interface device (e.g., a network interface component included in the communication components 2164) and utilizing any one of a number of well-known transfer protocols (e.g., hypertext transfer protocol (HTTP)). Similarly, the instructions 2116 may be transmitted or received using a transmission medium via the coupling 2172 (e.g., a peer-to-peer coupling) to devices 2170. The term "transmission medium" shall be taken to include any intangible medium that is capable of storing, encoding, or carrying instructions 2116 for execution by the machine 2100, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method of handling duplicate records in a computer database, the method comprising:
   receiving a record via an API;
   in response to the receiving:
      obtaining a duplicate check schema corresponding to an item type assigned to the record, the duplicate check schema identifying plurality of fields in records of the item type, the plurality of fields including at least one default field and at least one user-defined field, the duplicate check schema further defining one or more processing rules for use when a duplicate is located;
      generating a string for the record by extracting values for each of the plurality of fields, identified in the duplicate check schema, located in the record and concatenating the values;
   detecting a request to utilize the record; and
   in response to the detecting:
      applying a hash algorithm to the string to create a hash for the record;
      comparing the hash for the record to hashes from previous records stored in the computer database to identify whether the hash is a duplicate; and
      in response to a determination that the hash is a duplicate, executing the one or more processing rules.

2. The method of claim 1, wherein the record is a billable item in a convergent invoicing system and the item type is a billable item type.

3. The method of claim 2, wherein the executing of the one or more processing rules results in the billable item transitioning to a state of billable, don't accept, raw, or raw except.

4. The method of claim 2, wherein the executing of the one or more processing rules results in the billable item transitioning to a state of billable, don't accept, raw, raw reversed, or raw except.

5. The method of claim 2, wherein the generating of the string is performed in response to the record being received and the applying of the hash algorithm is performed in response to an indication that the record should have a state transitioned to billable.

6. The method of claim 2, wherein the generating of the string is performed in response to the record being received and the applying of the hash algorithm is performed in response to an indication that the record should have a state transitioned to unrated.

7. The method of claim 1, wherein the record is a consumption item in a convergent invoicing system and the item type is a consumption item type.

8. The method of claim 7, wherein the executing of the one or more processing rules results in the consumption item transitioning to a state of unrated, don't accept, of unrated except.

9. The method of claim 7, wherein the executing the one or more processing rules results in the consumption item transitioning to a state of unrated, don't accept, unrated reversed or unrated except.

10. A system comprising:
an enterprise resource planning (ERP) component including:
a loading module executable by a processor and configured to:
receive a record via an API;
in response to the receiving:
obtain a duplicate check schema corresponding to an item type assigned to the record, the duplicate check schema identifying a plurality of fields in record of the item type, the plurality of fields including at least one default field and at least one user-defined field, the duplicate check schema further defining one or more processing rules for use when a duplicate is located;
generate a string for the record by extracting values for each of the plurality of fields, identified in the duplicate check schema, located in the record and concatenating the values;
detect a request to utilize the record:
in response to the detecting:
apply a hash algorithm to the string to create a hash for the record;
compare the hash for the record to hashes from previous records stored in a computer database to identify whether the hash is a duplicate; and
in response to a determination that the hash is a duplicate, execute the one or more processing rules.

11. The system of claim 10, further comprising a customer relationship management (CRM) component configured to manage relationships with one or more customers and send billable items to the billing component of the convergent invoicing module of the ERP component.

12. The system of claim 10, further comprising a convergent charging component that includes pricing and rating component, an account balance management component, and a subscription management component.

13. A non-transitory computer-readable storage medium comprising instructions that, when executed by at least one processor of a machine, cause the machine to perform operations comprising:
receiving a record via an API;
in response to the receiving:
obtaining duplicate check schema corresponding to an the item type assigned to the record, the duplicate check schema identifying a plurality of fields in records of the item type, the plurality of fields including at least one default field and at least one user-defined field, the duplicate check schema further defining one or more processing rules for use when a duplicate is located;
generating a string for the record by extracting values for each of the plurality of fields, identified in the duplicate check schema, located in the record and concatenating the values;
detecting a request to utilize the record; and
in response to the detecting:
applying a hash algorithm to the string to create a hash for the record;
comparing the hash for the record to hashes from previous records stored in the computer database to identify whether the hash is a duplicate: and
in response to a determination that the hash is a duplicate, executing the one or more processing rules.

14. The non-transitory computer-readable storage medium of claim 13, wherein the record is a billing item in a convergent invoicing system and the item type is a billing item type.

15. The non-transitory computer-readable storage medium of claim 14, wherein the executing of the one or more processing rules results in the billing item transitioning to a state of billable, don't accept, raw or raw except.

16. The non-transitory computer-readable storage medium of claim 14, wherein the executing of the one or more processing rules results in the billing item transitioning to a state of billable, don't accept, raw, raw reversed, or raw except.

17. The non-transitory computer-readable storage medium of claim 14, wherein the generating of the string is performed in response to the record being received and the applying of the hash algorithm is performed in response to an indication that the record should have a state transitioned to billable.

18. The non-transitory computer-readable storage medium of claim 13, wherein the record is a consumption item in a convergent invoicing system and the item type is a consumption item type.

19. The non-transitory computer-readable storage medium of claim 18, wherein the executing of the one or more processing rules results in the consumption item transitioning to a state of unrated, don't accept, or unrated except.

20. The non-transitory computer-readable storage medium of claim 18, wherein the executing of the one or more processing rules results in the consumption item transitioning to a state of unrated, don't accept, unrated reversed or unrated except.

* * * * *